US006917653B2

United States Patent
Hori et al.

(10) Patent No.: US 6,917,653 B2
(45) Date of Patent: Jul. 12, 2005

(54) METHOD OF DESCRIBING OBJECT REGION DATA, APPARATUS FOR GENERATING OBJECT REGION DATA, VIDEO PROCESSING METHOD, AND VIDEO PROCESSING APPARATUS

(75) Inventors: Osamu Hori, Yokohama (JP); Toshimitsu Kaneko, Yokohama (JP); Takeshi Mita, Yokohama (JP); Koji Yamamoto, Yokohama (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 10/319,485

(22) Filed: Dec. 16, 2002

(65) Prior Publication Data

US 2003/0086491 A1 May 8, 2003

Related U.S. Application Data

(62) Division of application No. 09/633,231, filed on Aug. 4, 2000.

(30) Foreign Application Priority Data

Aug. 4, 1999 (JP) ........................................... 11-221424

(51) Int. Cl.[7] ........................... H04N 7/12; H04N 11/02
(52) U.S. Cl. ............................. 375/240.25; 375/240.26
(58) Field of Search ............................... 382/237, 241, 382/243; 345/473, 474, 672, 676; 375/240.09, 240.08, 240.16, 240.01

(56) References Cited

U.S. PATENT DOCUMENTS

| 5,966,469 | A | * | 10/1999 | Moon et al. ................. 382/241 |
| 5,982,909 | A | * | 11/1999 | Erdem et al. ................ 382/103 |
| 5,986,675 | A | * | 11/1999 | Anderson et al. ........... 345/473 |
| 6,072,908 | A | * | 6/2000 | Park et al. ................... 382/243 |
| 6,203,425 | B1 | * | 3/2001 | Hayashi ......................... 463/1 |
| 6,323,879 | B1 | * | 11/2001 | Sauerbrei .................... 345/672 |
| 6,381,368 | B1 | * | 4/2002 | Kanatsu ....................... 382/233 |
| 6,414,685 | B1 | * | 7/2002 | Takakura et al. ........... 345/473 |
| 6,646,644 | B1 | * | 11/2003 | Suzuki et al. ............... 345/474 |

* cited by examiner

*Primary Examiner*—Chris Kelley
*Assistant Examiner*—Dave Czekaj
(74) *Attorney, Agent, or Firm*—Oblon, Spivak, McClelland, Maier & Neustadt, P.C.

(57) ABSTRACT

An object-region-data describing method for describing object region data relating to a time-series variation of an object region in video data including a plurality of frames, the method comprising obtaining a conversion parameter representing conversion from a reference object region into a target object, approximating a time-series variation of the conversion parameter by an approximate function, and describing the object region data using an approximate function parameter identifying the approximate function and information on the reference object region. Thus, it is possible to describe a region of the desired object in video data by a small quantity of data and facilitate generating the object regions and handling data on the object region.

23 Claims, 28 Drawing Sheets

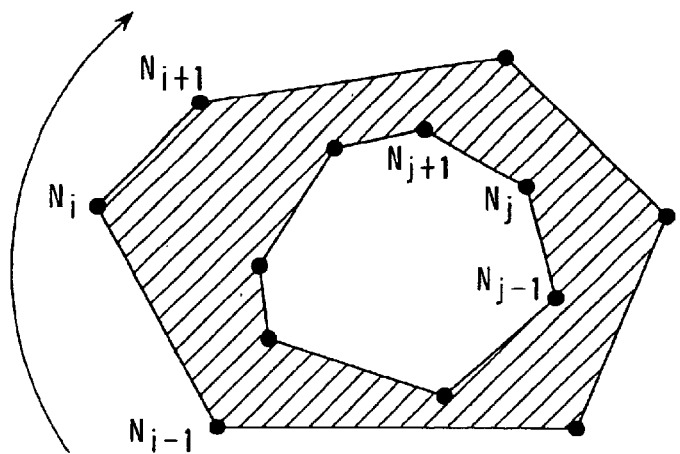
FIG. 15
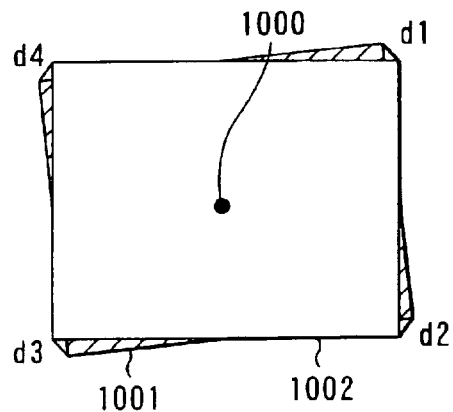
FIG. 16
| MOVEMENT MODEL / APPROXIMATE FIGURE | ENLARGEMENT/REDUCTION | ROTATION | PARALLEL TRANSLATION | 4-PARAMETER CONVERSION | AFFINE CONVERSION | PROJECTION CONVERSION | PARABOLIC CONVERSION |
|---|---|---|---|---|---|---|---|
| RECTANGLE, ELLIPSE (WITHOUT GRADIENT) | ○ | × | ○ | × | × | × | × |
| RECTANGLE, ELLIPSE (WITH GRADIENT) | ○ | ○ | ○ | ○ | × | × | × |
| PARALLELOGRAM | ○ | ○ | ○ | ○ | ○ | × | × |
| POLYGON (NUMBER OF VERTEXES >11) | ○ | ○ | ○ | ○ | ○ | ○ | ○ |
FIG. 17

| FUNCTION ID | TYPE OF FUNCTION | FUNCTION PARAMETER | LIMIT CONDITION |
|---|---|---|---|
| -1 | NO TYPE (NUMBER IS NOT DEFINED) | NO PARAMETER | NO LIMIT |
| 0 | $f(t)=f_a+v_a(t-t_a)$ | NO PARAMETER | $v_a = \dfrac{f_b-f_a}{t_b-t_a}$ |
| 1 | $f(t)=f_a+v_a(t-t_a)+\dfrac{1}{2}a_a(t-t_a)^2$ | $a_a$ | $v_a = \dfrac{f_b-f_a}{t_b-t_a} - \dfrac{1}{2}a_a(t_b-t_a)$ |

METHOD OF DESCRIBING OBJECT REGION DATA, APPARATUS FOR GENERATING OBJECT REGION DATA, VIDEO PROCESSING METHOD, AND VIDEO PROCESSING APPARATUS

CROSS-REFERENCE TO RELATED APPLICATIONS

This application is based upon and claims the benefit of priority from the prior Japanese Patent Application No. 11-221424, filed Aug. 4, 1999, the entire contents of which are incorporated herein by reference.

BACKGROUND OF THE INVENTION

The present invention relates to an object region data describing method for describing information on an object region in a video, an object region data generating apparatus for generating information on an object region in a video, and a video processor for utilizing and controlling, and searching and retrieving an object in a video as well as a video processing method.

As a method of describing an object region in a video, there is conventionally known MPEG-4 object coding. According to this MPEG-4 object coding, an object region is expressed as a bit map for each frame, information is compressed within or between the frames and the shape and texture of the object are separately coded.

This object coding is, however, intended to express an object region having an arbitrary shape and texture in a compact fashion. Due to this, the object thus coded is subjected to inter-frame compression, making it difficult to fetch information on the object region for each frame. Further, if only positional information on the region in the video is to be expressed, this method disadvantageously causes over-specification and takes a lot of processing time for a codec.

BRIEF SUMMARY OF THE INVENTION

Accordingly, it is an object of the present invention to provide an object region data describing method and an object region data generating apparatus capable of describing a desired object region with a small quantity of data and facilitating generating the object region and handling the data on the object region.

A related object of the present invention is to provide an object region data describing method, an object region data generating apparatus, a video processing method and a video processing apparatus which allow a user to easily determine that an object in video data is indicated by a user.

According to the present invention, there is provided an object region data description method for describing information on a region of an arbitrary object in video data over a plurality of continuous frames, characterized by comprising expressing a region of a target object in the video data by a conversion parameter indicating region conversion from a predetermined reference object region into the region of the target object, and describing information on the region of the target object based on the conversion parameter and information on the predetermined reference object region.

Further, the present invention is an object region description method for describing information on a region of an arbitrary object in video data over a plurality of continuous frames, characterized by comprising expressing a region of a target object in the video data by a conversion parameter indicating region conversion from a predetermined reference object region into the region of the target object, approximating a trajectory of the conversion parameter to a predetermined approximate function, and describing information on the region of the target object based on an approximate function parameter for specifying the predetermined approximate function and information on the reference object region.

Preferably, the information on the region of the target object is described by describing the conversion parameter as it is.

Preferably, the reference object region is expressed by a bit map.

Preferably, the reference object region is expressed by a representative point of an approximate figure of the object region.

Preferably, the approximate figure is a rectangle or an ellipse without gradient, a rectangle or an ellipse with gradient or a polygon.

Preferably, types of the region conversion and the conversion parameter are selected according to a type of the approximate figure.

Preferably, representative points of the approximate figure are ordered in advance.

Preferably, to obtain the conversion parameter, the reference object region is selected so that an error between an actual region of the target object and a predicted object region obtained by the conversion parameter may be a minimum.

Preferably, a region of the target object in a central frame in a plurality of continuous frames in which the region of the target object exists, is selected as the reference object region.

Preferably, while setting a region of the target object in a certain frame as the reference object region, the conversion parameter for a region of the target object in a frame following the certain frame is obtained; and if the error between the actual region of the target object and the predicted object region obtained by the conversion parameter exceeds a preset threshold value, the reference object region is updated to a new reference object region, the new reference object region is a region of the target object in a new frame.

Preferably, while setting a region of the target object in a frame positioned at a center of the plurality of continuous frames as the reference object region, a processing for obtaining the conversion parameter for regions of the target object in frames continuous to the frame positioned at the center, is executed based on the reference object region; and the processing is executed repeatedly to a plurality of continuous frames in a range in which an error between an actual region of the target object and a predicted object region obtained by the conversion parameter exceeds a preset threshold value.

Preferably, the region of the target object is divided into a plurality of regions; and information on the region of the target object is described by expressing the plurality of regions obtained by division by the conversion parameter independently of one another.

Preferably, either related information related to the object or information indicating a method of accessing the related information is also described.

Furthermore, the present invention is a computer readable recording medium storing object region data including information on a single or a plurality of object regions described by the above object region data description method based on the video.

Also, the present invention is a video processing method for determining whether a specific object is specified on an image screen displaying video data formed of a plurality of continuous frames, characterized by comprising acquiring information on a reference object region corresponding to the object region existing in the frames of the video data, and information on a conversion parameter indicating region conversion from the reference object region into the object region, when an arbitrary position is specified on the image screen displaying the video data; inversely converting the specified position into a position in a frame in which the reference object region exists by the conversion parameter; and determining whether the position obtained by inverse conversion exists inside of the reference object region, and determining whether the object has been specified if it is determined that the position exists inside of the reference object region.

Preferably, if the reference object region is expressed by a representative point, the reference object region is expanded on a bit map and it is determined whether the position obtained by the inverse conversion exists inside of the reference object region expanded on the bit map.

Preferably, if it is determined that the object has been specified, related information related to the object is presented.

Moreover, the present invention is an object region data generating apparatus for describing information on an arbitrary object in video data over a plurality of continuous frames, characterized by comprising a first processor configured to express a region of a target object in the video data by a conversion parameter indicating region conversion from a predetermined reference object region into the region of the target object, and a second processor configured to express information on the region of the object based on the conversion parameter and information on the reference object region.

In addition, the present invention is an object region data generating apparatus for describing information on an arbitrary object in video data over a plurality of continuous frames, characterized by comprising a first processor configured to express a region of a target object in the video data by a conversion parameter indicating region conversion from a predetermined reference object region into the region of the target object, a second processor configured to approximates a trajectory of arrangement the conversion parameter along progression of the frames by a predetermined approximate function, wherein information on the region of the target object is described by an approximate function parameter for specifying the predetermined approximate function and information on the reference object region.

Furthermore, the present invention is a video processing apparatus for determining whether a specific object is specified on an image screen displaying video data formed of a plurality of continuous frames, characterized by comprising a first processor configured to acquire information on a reference object region corresponding to an object region existing in the frames of the video data, and information on a conversion parameter indicating region conversion from the reference object region into the object region, when an arbitrary position is specified on the image screen displaying the video data; a second processor configured to inversely converting the specified position into a position in a frame in which the reference object region exists by the conversion parameter; and a third processor configured to determine whether the position obtained by inverse conversion exists inside of the reference object region, and for determining whether the object has been specified if it is determined that the position exists inside of the reference object region.

It is noted that the present invention directed to the apparatus is also realized as an invention directed to the method, and that the present invention directed to the method is also realized as an invention directed to the apparatus.

The present invention directed to either the apparatus or the method can be realized as a computer readable recording medium which stores a computer program for allowing a computer to execute predetermined procedure corresponding to the invention (or for allowing the computer to function as predetermined processors corresponding to the invention or to realize predetermined functions corresponding to the invention).

In the present invention, the region existing continuously or intermittently in the frames and the region information on an object to be expressed are described by an approximate figure or a bit map for each frame, and at least one object region used for reference is selected in an object region existing time-interval. Conversion parameters for converting the reference object region into other object regions are calculated, the conversion parameters are aligned in the order of continuous frames and a trajectory of the parameters is obtained. Alternatively, this trajectory may be expressed with a small quantity of information by an approximate function. According to this method, an object region having time space information is expressed by, for example, information on the reference object region, the approximate function of the conversion parameters and the object region existing time-interval. Further, if information on an object region in an arbitrary frame is obtained, for example, conversion parameters are obtained from the approximate function and a predicted object region modified from the object region by the conversion parameters is obtained from the object region to thereby set the region as an object region to be obtained.

Furthermore, to determine whether the position indicated by, for example, a mouse is temporally and spatially inside or outside of an object region, inverse conversion is executed while using the obtained conversion parameters, and the positional information on the mouse pointer is converted into coordinates in a certain frame in the reference object region. Then, it is determined whether or not the position is inside or outside of the reference object region and whether the position is in the object region of the indicated frame. In this way, it is possible to easily determine whether the point is inside or outside of an object region, thereby making it possible to realize a hypermedia application having good operability.

According to the present invention, the shape and positional information on an object which is moving in a video and changing its shape can be described with small capacity and information on the object region for each frame can be obtained at high speed. In case of indicating an object in a video using a mouse pointer such as a hypermedia application, in particular, whether or not the position of the mouse pointer is included in the region of the object can be determined at high speed and operation environment of excellent interactive characteristics can be thereby provided. Further, the movement and size of an object region can be easily grasped, and the present invention can be applied to an application for a search and retrieval system or supervising system.

Additional objects and advantages of the present invention will be set forth in the description which follows, and in part will be obvious from the description, or may be learned by practice of the present invention.

The objects and advantages of the present invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the present invention and, together with the general description given above and the detailed description of the preferred embodiments given below, serve to explain the principles of the present invention in which:

FIG. 15 shows an example in which an object region having a vacant space is expressed by approximate figures;

FIG. 16 is an explanatory view for a method of making the representative points of an approximate figures of object regions correspond to each other;

FIG. 17 shows the relationship between the types of approximate figures and conversion models for which conversion parameters can be obtained;

DETAILED DESCRIPTION OF THE INVENTION

A preferred embodiment of an object region data describing method, an object region data generating apparatus, a video processing method and a video processing apparatus according to the present invention will now be described with reference to the accompanying drawings.

First Embodiment

Figure 1:
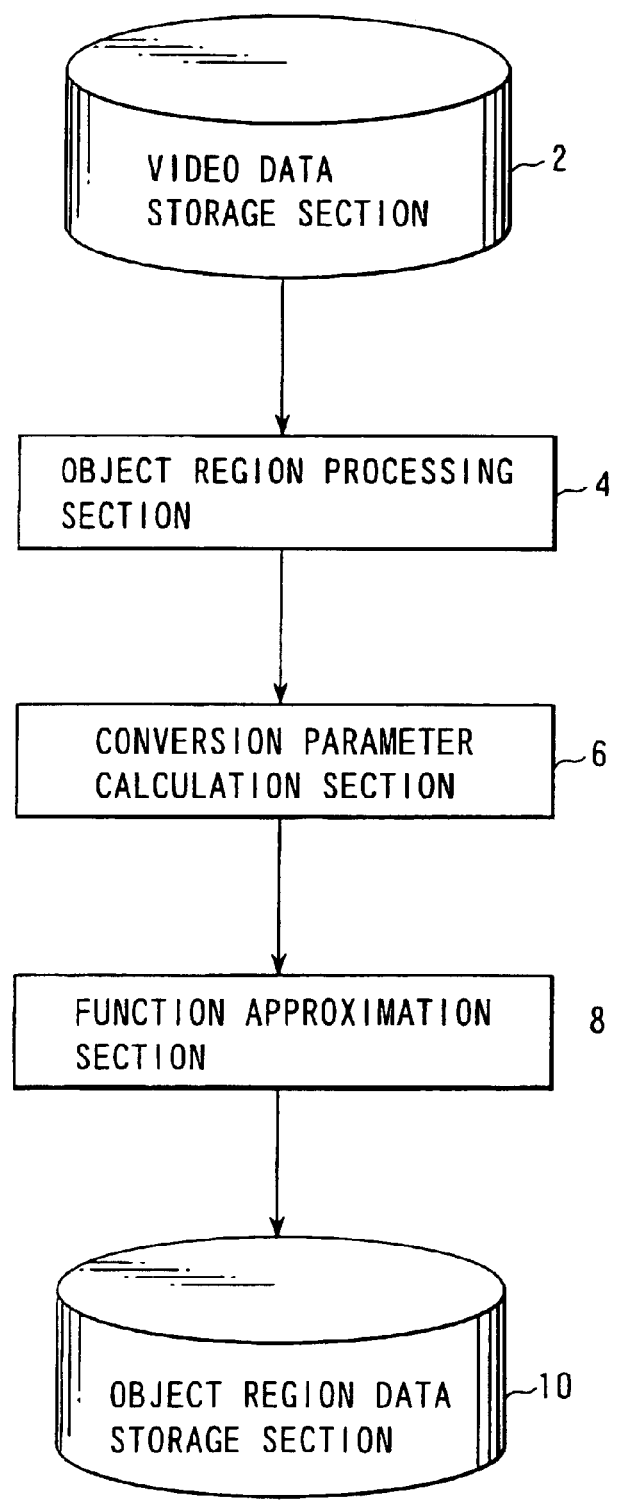
FIG. 1 shows an example of the constitution of an object region data generating apparatus according to a first embodiment of the present invention.

FIG. 1 shows an example of the constitution of an object region data generating apparatus according to the first embodiment of the present invention. As shown in FIG. 1, this object region data generating apparatus is comprised of a video data storage section 2, an object region processing section 4, a conversion parameter calculation section 6, a function approximation section 8, and an object region data storage section 10. If procedure executed by the generating apparatus are intervened by the operation of a user, a graphical user interface (GUI) for displaying video (moving image) data in, for example, units of frames and for receiving the input of a user's command, is employed (GUI is not shown in FIG. 1).

An object region is a bunch of regions in a video and any matters such as a person, an animal, a plant, an automobile, a building, river, the sun or a cloud (or part of them, e.g., the head of the person, the bon-net of the automobile or the entrance of the building), which can be grasped as an object can be handled.

The video data storage section 2 stores video data. The section 2 is constituted by, for example, a hard disk device, an optical disk device or a semiconductor memory. It is noted that the video data storage section 2 is not necessarily located at the same site as that of the other sections and may be located remotely through the Internet or the like.

The object region processing section 4 executes a processing for obtaining an object region in a frame serving as a reference (reference object region) and an object region in a frame serving as a target (target object region).

The conversion parameter calculation section 6 executes a processing for calculating the conversion parameters of the target object region based on the reference object region.

The function approximation section 8 executes a processing for approximating a time series trajectory by a time function for each conversion parameter of the object region. As will be described later, if the conversion parameters themselves are described, this function approximation section 8 is not necessary.

The object region data storage section 10 stores object region data including data for expressing a functional formula approximating the time series trajectory for each conversion parameter.

Although it is preferable that the reference object region is updated, a section relating to the update processing is not shown in FIG. 1.

The video data storage section 2 and the object region data storage section 10 may be constituted by individual storage devices or media. Alternatively, all of or part of these sections may be constituted by a common storage device or medium.

This object region data generating apparatus can be also realized by executing a software on a computer.

Figure 2:
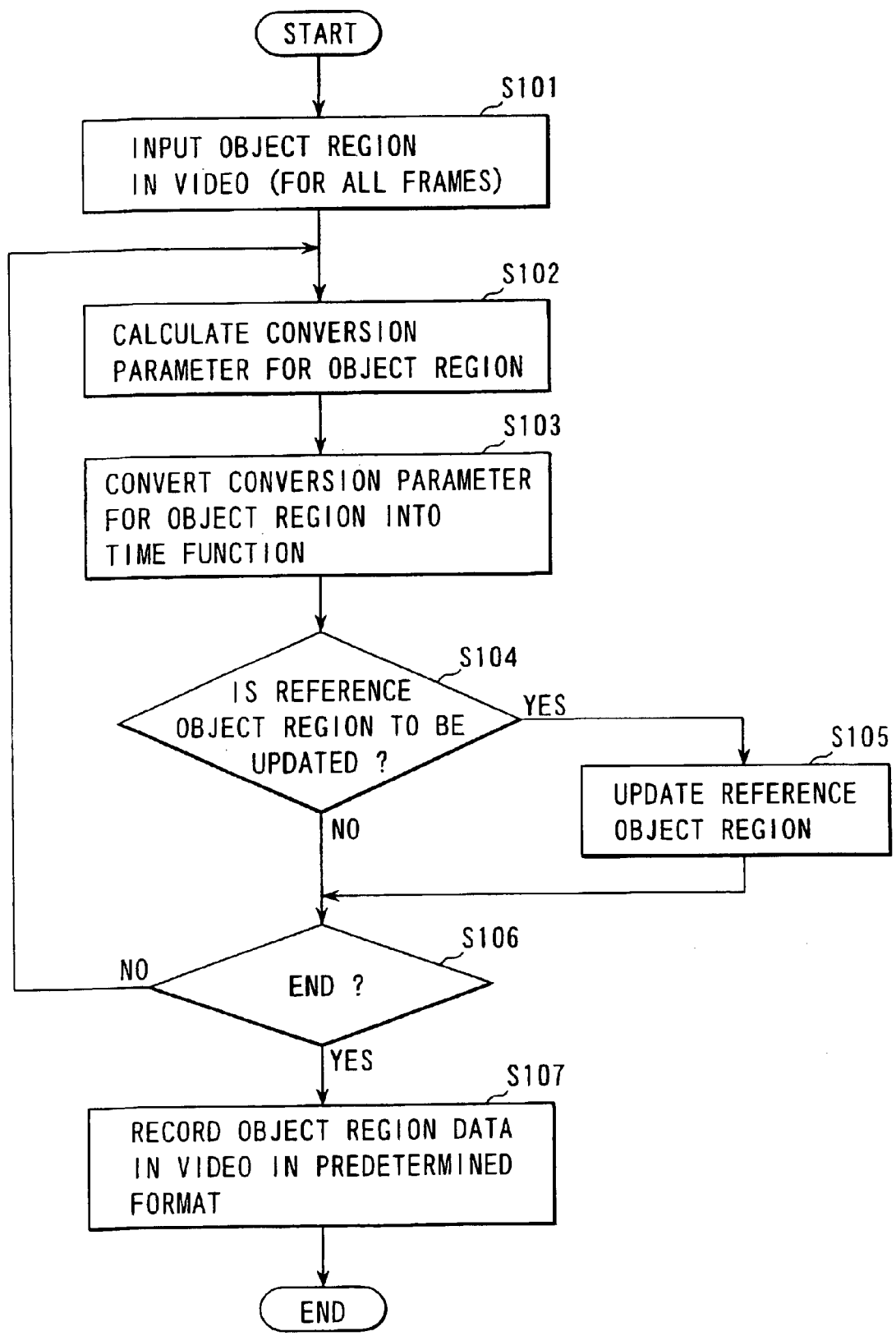
FIG. 2 is a flow chart showing one example of processing procedure in the first embodiment.

FIG. 2 shows one example of the processing procedure of the object region data generating apparatus according to this embodiment.

First, in step S101, object regions in all frame in a video are inputted (while assuming that object regions are known). If the object regions are manually input through GUI, the contour of an object serving as a processing target in the video is specified by a pointing device such as a mouse or a touch panel. The interior of the contour of the object inputted manually may be set as an object region. Alternatively, after fitting an inputted contour to the contour line of the object in an image by means of a technique using a dynamic outline model referred to as Snakes (see, for example, M. Kass, A. Witkin and D. Terzopolus, "Snakes: Active contour models", Processings of the 1st International Conference on Computer Vision, pp. 259–268, 1987), the interior of the contour thus fitted may be set as an object region. Instead of manually inputting the contour, object regions may be obtained automatically by executing an image processing. If data relating to the object regions are already present, it is possible to input such data.

At least one of these object regions is registered as a reference object region. To register the object region, there is proposed a method including generating and storing a binary bit map on which "1" corresponds to the interior of each object region and "0" corresponds to the outside of the region.

Further, a frame including the reference object region is registered as a reference frame.

Next, in step S102, a conversion parameter for converting the reference object region into an object region in one frame serving as a processing target (to be referred to as "target object region" hereinafter) is calculated.

This processing can be realized by a combination of, for example, a processing for calculating an optical flow in the target object region and a processing for converting the optical flow into the conversion parameter. The processing for calculating an optical flow in the target object region is to calculate the movement (optical flow) of each pixel (or a block formed of a plurality of pixels) in the object region from the reference frame to a present frame.

Figure 3:
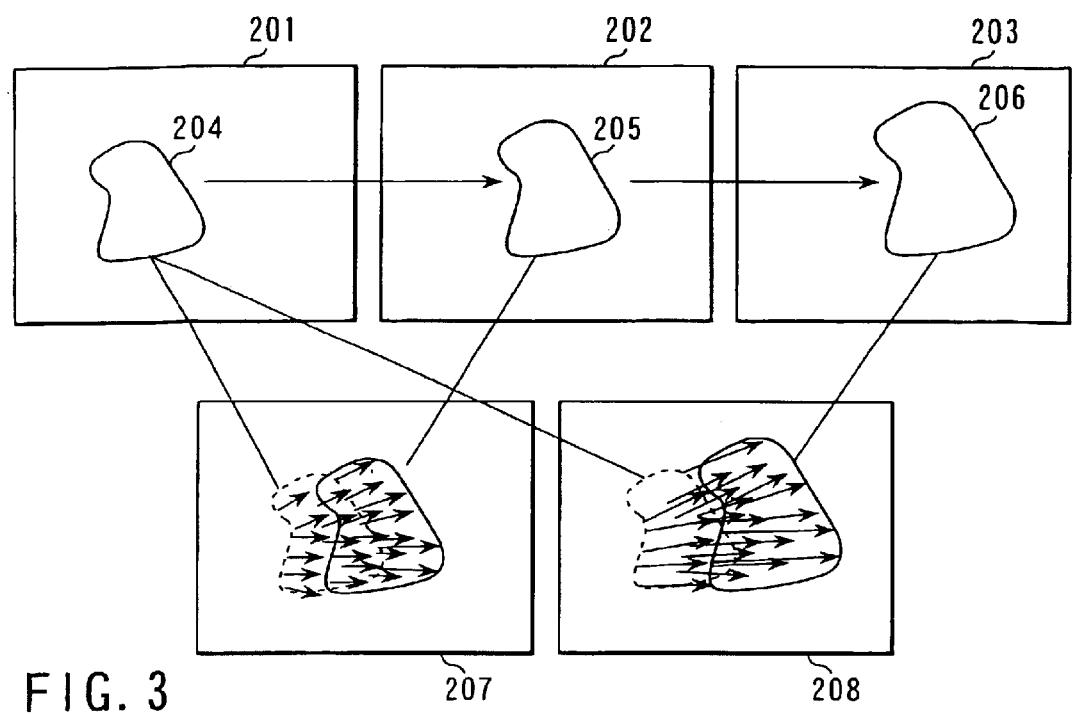
FIG. 3 is an explanatory view for one example of a method of calculating an object region optical flow.

FIG. 3 shows the schematic of a processing example for obtaining an optical flow in the object region in each frame. In FIG. 3, reference symbol 201 denotes a reference frame, 202 denotes the next frame to the reference frame, and 203 denotes the next frame to the frame 202. Reference symbols 204, 205 and 206 denote object regions in the respective frames. Reference symbol 207 denotes the optical flow of the object region from the frame 201 to the frame 202. Reference symbol 208 denotes the optical flow of the object region from the frame 201 to the frame 203.

As can be seen, the optical flow obtaining method can directly associate the reference object region with an object region in an arbitrary frame. This facilitates procedure for calculating an object region in an arbitrary frame and for determining whether a specified coordinates indicate the interior or the exterior of the object.

Figure 4:
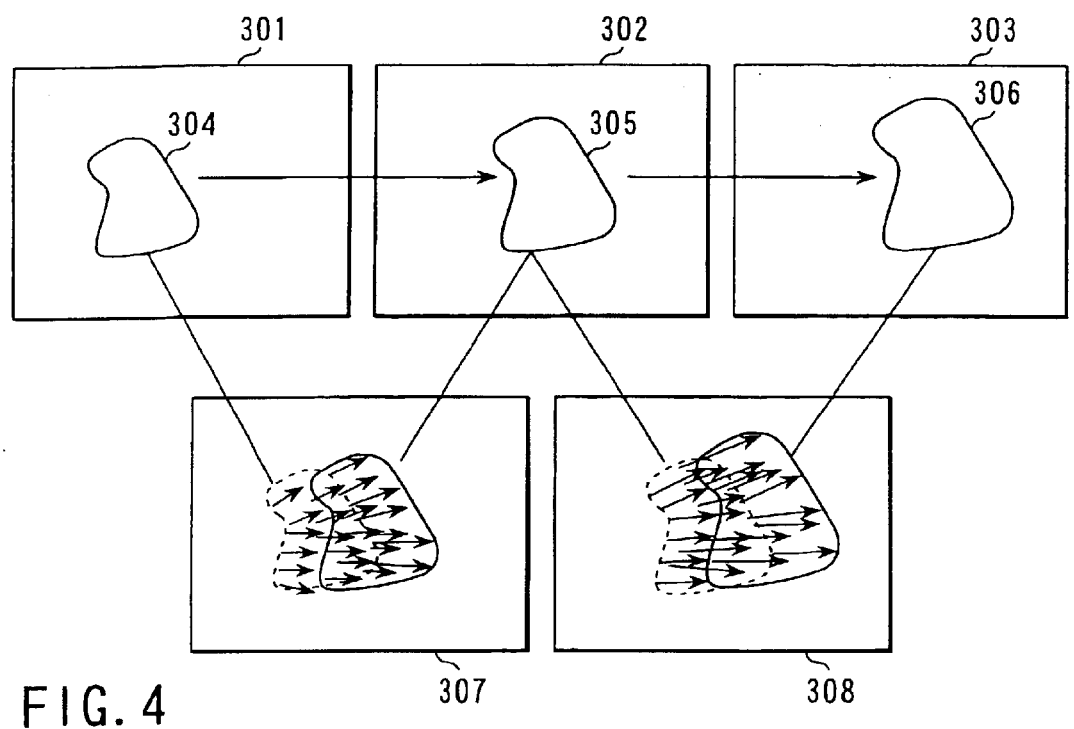
FIG. 4 is an explanatory view for another example of the method of calculating an object region optical flow.

In the example of FIG. 3, the optical flow of each pixel (or each block formed of a plurality of pixels) in the object region from the reference frame to the current frame is obtained. Alternatively, the optical flow of each pixel (or each block formed of a plurality of pixels) in the object region from one frame before the current frame and the current frame may be obtained. FIG. 4 shows the schematic of a processing example in the latter case.

In FIG. 4, reference symbol 301 denotes a reference frame, 302 denotes the next frame to the reference frame, and 303 denotes the next frame to the frame 302. Reference symbols 304, 305 and 306 denote object regions in the respective frames. Reference symbol 307 denotes the optical flow of the object region from the frames 301 to 302. Reference symbol 308 denotes the optical flow of the object region from the frame 302 to 303.

If calculating optical flows as shown in FIG. 4, parameter variations becomes smaller than those in the method of FIG. 3. However, the calculation of the object region in an arbitrary frame is more complex than the method of FIG. 3. While either the method shown in FIG. 3 or that shown in FIG. 4 may be employed, description will be continued while assuming that the optical flow is calculated by the method shown in FIG. 3 in this embodiment.

Many methods for obtaining an optical flow have been already proposed (see, for example, J. L. Barron, D. J. Fleet and S. S. Beauchemin, "Performance of Optical Flow Techniques", International Journal of Computer vision, vol. 12, no. 1, pp. 43–77, 1994). It is possible to adopt any method to obtain an optical flow.

It is also possible to select a plurality of characteristic points in the reference object region and to use a moving vector obtained by template matching with blocks centered around the characteristic points used as a template.

Next, a processing for calculating a conversion parameter from an optical flow is executed. It is noted that a conversion parameter to be obtained varies according to conversion models which the parameters are based on.

In this embodiment, the following models can be selected:

"Enlargement/reduction model" and "Rotation model" as models when the number of parameters is 1;

"Parallel translation model" as a model when the number of parameters is 2;

"Composite model of enlargement & reduction/rotation/parallel translation models" (to be referred herein as "4-parameter conversion model") as a model when the number of parameters is 4;

"Affine conversion model" as a model when the number of parameters is 6;

"Projection conversion model" as a model when the number of parameters is 8; and "Parabolic conversion model" as a model when the number of parameters is 12.

The respective models are expressed by the following mathematical formulas (1) to (7):

$$x'=a_0 x,$$
$$y'=a_0 y \qquad (1)$$

$$x'=x \cos a_0 - y \sin a_0,$$
$$y'=x \cos a_0 + y \sin a_0 \qquad (2)$$

$$x'=x+a_0,$$
$$y'=y+a_1 \qquad (3)$$

$$x'=a_0 x+a_1 y+a_2,$$
$$y'=a_1 x-a_0 y+a_3 \qquad (4)$$

$$x'=a_0 x+a_1 y+a_2,$$
$$y'=a_3 x+a_4 y+a_5 \qquad (5)$$

$$x'=(a_0 x+a_1 y+a_2)/(a_3 x+a_4 y+1),$$
$$y'=(a_5 x+a_6 y+a_7)/(a_3 x+a_4 y+1) \qquad (6)$$

$$x'=a_0 x^2+a_1 xy+a_2 y^2+a_3 x+a_4 y+a_5,$$
$$y'=a_6 x^2+a_7 xy+a_8 y^2+a_9 x+a_{10} y+a_{11} \qquad (7)$$

The mathematical formula (1) corresponds to the enlargement and reduction model, the mathematical formula (2) corresponds to the rotation model, the mathematical formula (3) corresponds to the parallel translation model, the mathematical formula (4) corresponds to the 4-parameter conversion model, the mathematical formula (5) corresponds to the Affine conversion model, the mathematical formula (6) corresponds to the projection conversion model, and the mathematical formula (7) corresponds to the parabolic conversion model. In the formulas, (x, y) denotes coordinates in the reference object region, and (x', y') denotes the coordinates of the corresponding point of the object in the target object region. In the respective conversion models, it is assumed that the relationship between corresponding points in the two frames can be expressed using parameters $a_0$ to $a_{11}$ as shown in the formulas. Needless to say, a parametric model other than the above-described models may be prepared.

To calculate the conversion parameter, a method of least squares can be employed. This method is to determine the conversion parameter so that the sum of the squares of an error generated when a combination of (x, y) and (x', y') obtained by optical flow are substituted into the conversion model mathematical formula may become a minimum. This is an old, conventional method and can be easily executed by matrix operation.

Next, in step S103, the calculated conversion parameter of the object region is converted to (approximated by) a time function.

Namely, "n" number of conversion parameters $a_i$ ($0 \leq i \leq n-1$) (e.g., n=12) in a certain time interval are expressed by:

$$a_i = f_i(t),$$

where $f_i(t)$ is the function of time t.

The time interval here is one including the frames for which an optical flow is calculated using the same reference object region. $f_i(t)$ may be a polynomial, a Spline function, a constant or the like.

Figure 5:
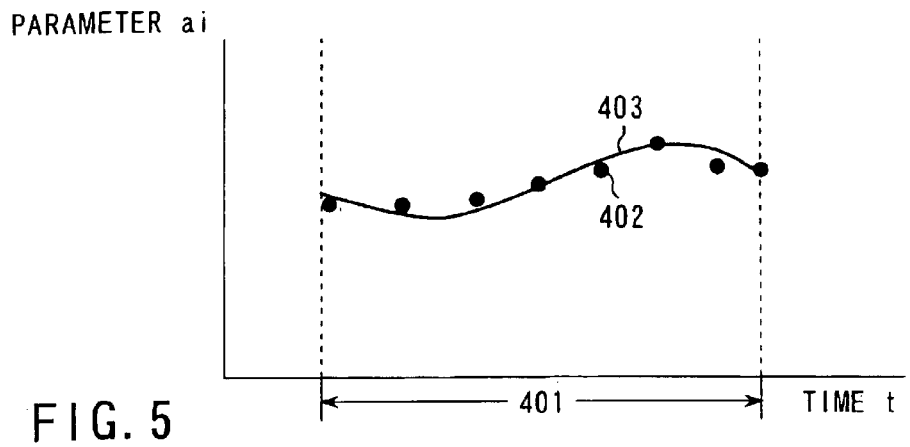
FIG. 5 is an explanatory view for an example of expressing a conversion parameter by an approximate time function.

FIG. 5 shows a state in which a certain conversion parameter $a_i$ calculated from the optical flow is expressed by a function. In FIG. 5, reference symbol 401 denotes a time interval in which a function is to be obtained, 402 denotes a value of $a_i$ calculated from the optical flow, and 403 denotes a function $a_i=f_i(t)$ expressing the parameter $a_i$.

The advantage of expressing parameter $a_i$ by a function is that the quantity of data for describing object regions can be reduced. If a polynomial of second degree or lower is used as a function, for example, three real numbers suffice to describe all parameter values in a certain time interval since this function can be expressed by three real numbers.

If a polynomial or a Spline function is used as a function expressing the conversion parameter, the conversion parameter $a_i$ is determined so that the error between the values of $a_i$ in the conversion target time interval and the values calculated by the function $f_i(t)$ may become small. By using, for example, the method of least squares, the parameter can be easily calculated.

This processing for obtaining an approximate function may be executed every time parameter values relating to the object region in each frame are obtained (e.g., a method of executing approximation and obtaining an approximate error every time parameter values in each frame are obtained, and appropriately dividing an approximate interval so that the approximate error may fall within a certain range). Alternatively, this processing may be executed simultaneously for all frames after the reference object region is updated and a reference frame interval is decided.

The processing procedure of step S103 will be described in detail later.

Next, in step S104, it is determined whether or not it is necessary to update the reference object region.

In this embodiment, an object region in an arbitrary frame is expressed by the reference object region in the reference frame and the conversion parameter of the reference object region. However, an object region to be expressed differ too greatly in shape from the reference object region, a shape similar to the object region to be expressed cannot be obtained even by moving/deforming the reference object region by the conversion parameter. In that case, it is effective to change the reference object region to an object region in another frame (to update the reference object region). In this embodiment, therefore, it is determined whether or not such a change is necessary in step S104.

To make this determination, it is possible to employ a method of determining whether or not the error between an actual object region in a certain frame and a predicted object region exceeds a preset threshold value. The predicted object region means an object region in a certain frame which is calculated from the reference object region by using the conversion parameter. The conversion parameter used for conversion is a value calculated from the time function $a_i = f_i(t)$. As the error between the actual object region and the predicted object region, a ratio of the area of a common portion to both regions to the area of a part which is not common can be used.

Next, in step S105, if it is determined at step S104 that it is necessary to update the reference object region, a reference object region update processing is executed. This processing is basically the same as the processing executed in step S101. That is to say, in the processing in step S105, the processing target frame for which the conversion parameter is calculated in step S102 is registered as a reference frame, and a binary bit map expressing the reference object region are generated. Further, an object region in the reference frame is registered as a reference object region.

In step S106, it is determined whether or not a processing for describing the object regions in the video is ended. This determination is based on, for example, whether or not a current object region is at the final frame of the video, whether or not a current object region is at the final frame of an object region existing time-interval, whether or not a user indicates the end of the description processing or the like. The processings from steps S102 to S104 or S105 are repeatedly executed for each frame until it is determined that the description processing is ended in step S106.

In step S107, information on the description of the object region (parameter of the function approximating conversion parameter) calculated by the preceding processings is recorded according to a predetermined description format. The information is recorded by the object region data storage section 10 such as, for example, a semiconductor memory inside or outside of a computer, a magnetic tape, a magnetic disk or an optical disk.

Figure 6:
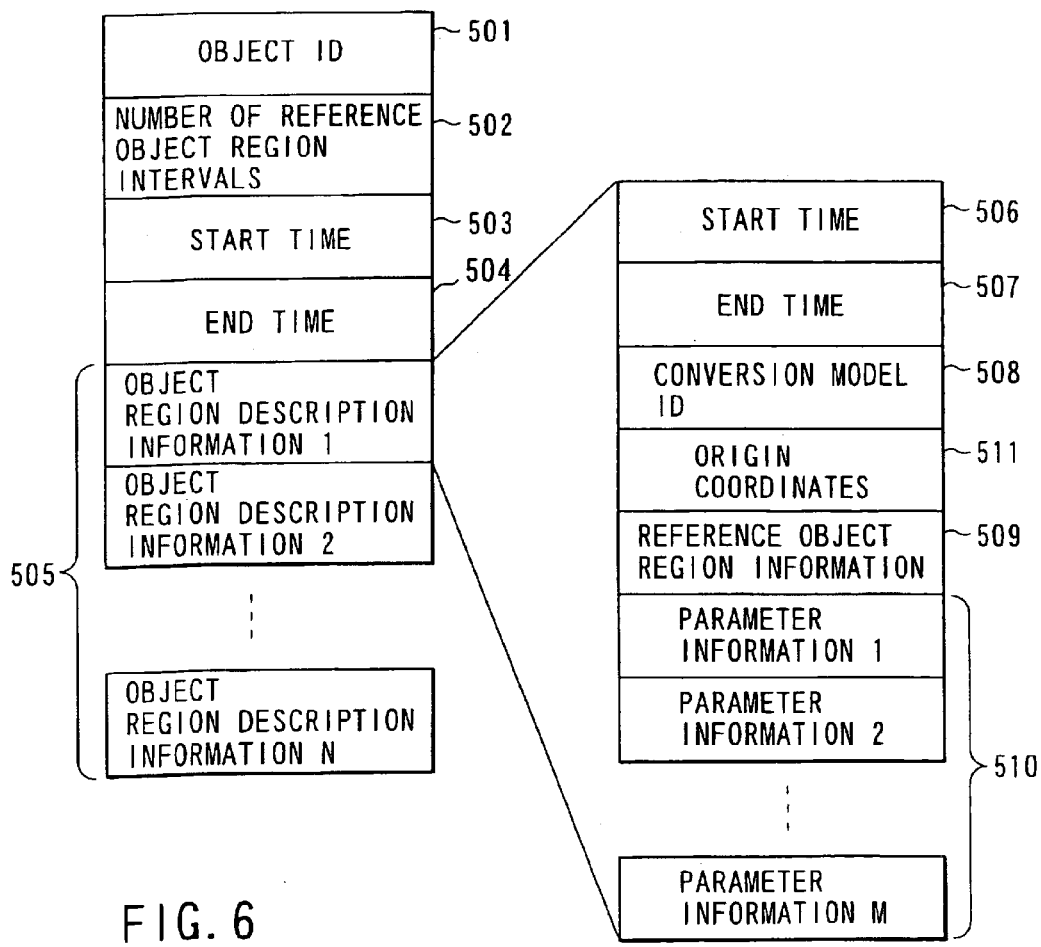
FIG. 6 shows one example of an object region data description format if the reference object region is expressed by a bit map.

FIG. 6 shows one example of an object region description format with respect to one object region in this embodiment.

In FIG. 6, reference symbol 501 denotes an object ID which is identification information (e.g., number or symbol) allotted to and peculiar to an object.

Reference symbol 502 denotes the number of constant reference object region time-intervals which is the number of frame intervals having the same reference object region (N in FIG. 6). This number N is also equal to the number of reference frames.

Reference symbols 503 and 504 denote a start time and an end time of object region existing time-intervals, respectively. Each time is described by time itself or frame number. The length of the object region existing time-interval (a subtraction value of time or frame number) may be used instead of the end time.

Reference symbol 505 denotes object region description information. The object region description information 505 is described for each reference object region interval, i.e., by the number of the constant reference object region time-intervals (N in the example of FIG. 6).

The concrete contents of each object region data description information are indicated by reference symbols 506 to 510 shown in FIG. 6.

The reference symbols 506 and 507 denote a start time and an end time of the reference object region interval, respectively. Each time is described by a time itself or a frame number. The length of the reference object region interval can be used instead of the end time.

The reference symbol 508 denotes a conversion model ID. This is intended to specify which model, such as the enlargement and reduction model, the Affine conversion model and the parabolic conversion model, is used to describe the object region.

Reference symbol 511 denotes the coordinates of an origin to determine where the coordinates of the origin of the conversion model is positioned in an image. The origin coordinate data can be omitted if such a rule as to set the position of the center of gravity of the reference object regions to be constantly at an origin, is predetermined.

The reference symbol 509 denotes reference object region data to specify a reference object region. To be specific, the reference object region data include the time of the reference frame (or frame number), bit map data representing the reference object regions (or a pointer to the bit map data). It is preferable that the bit map data is compressed and then stored since the data size is large unless compressed.

The reference symbol 510 denotes conversion parameter information. The conversion parameter information are described by the number of parameters (M parameters in the example of FIG. 6) set by a conversion model (conversion model ID). To be specific, the conversion parameters include an arrangement of parameter values in each frame, information for specifying an approximate function of the parameters (coefficient values) and the like. The conversion parameter information will be described later in detail.

By executing the above-described processings, the object regions changing spatially and/or temporally in the video can be recorded, as simple description data.

In this embodiment, the reference frame is the first frame in a constant reference object interval. The reference frame (and reference object region) can be arbitrarily selected. Other reference object region selection methods will be described later (in the fifth embodiment) in detail.

Other embodiments of the method and apparatus for describing object region according to the present invention will be described. The same portions as those of the first embodiment will be indicated in the same reference numerals and their detailed description will be omitted.

Second Embodiment

The second embodiment is basically the same as the first embodiment. Description will be given hereinafter, while focusing on only the differences of the second embodiment from the first embodiment.

The example of the constitution of an object region data generating apparatus in the second embodiment is the same as that in the first embodiment (FIG. 1).

Figure 7:
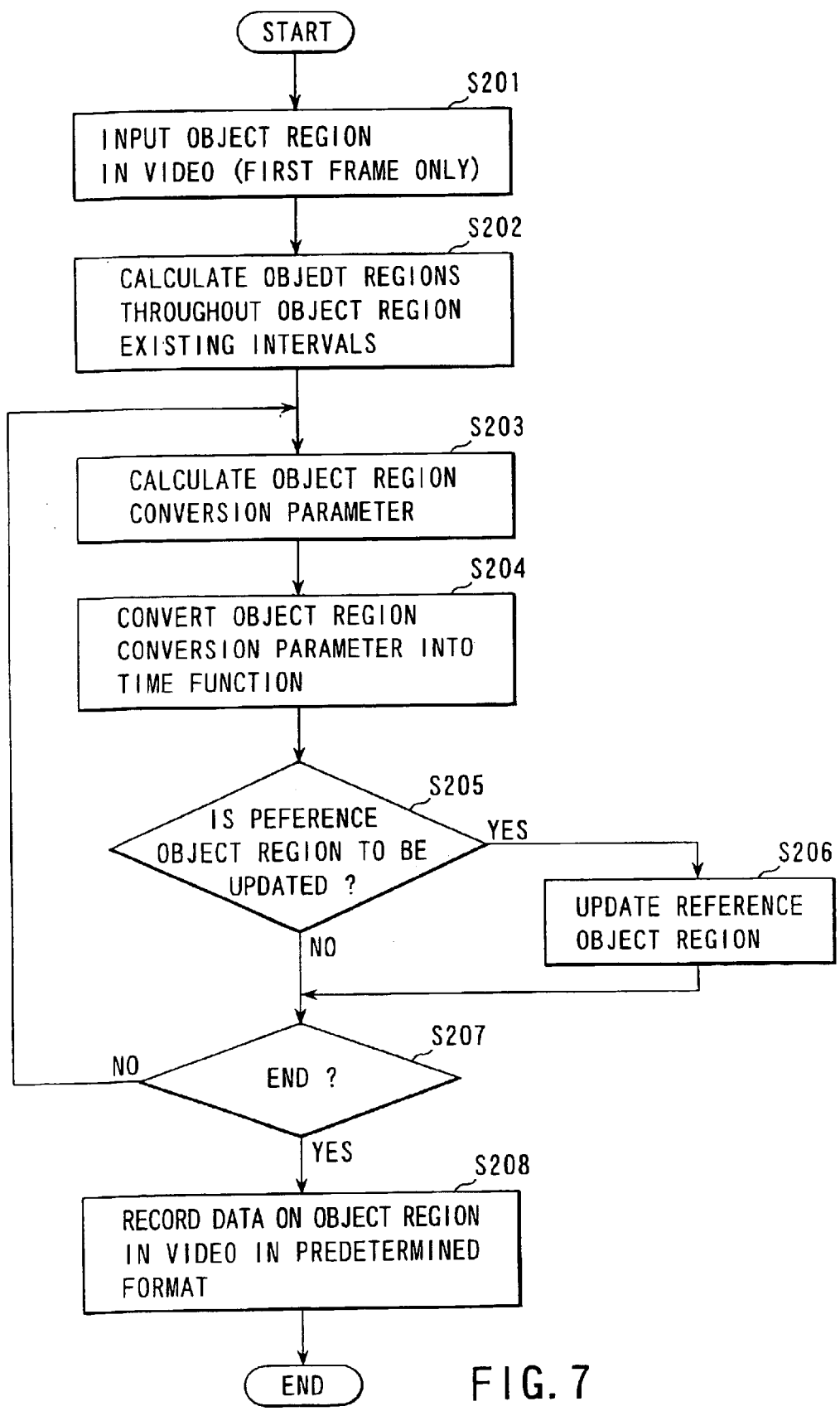
FIG. 7 is a flow chart showing an example of processing procedure in a second embodiment.

FIG. 7 shows one example of the processing procedure of the object region data generating apparatus in this embodiment.

In step S201, only an object region in the first frame in a frame interval in which object regions exist, is inputted through the GUI. The first frame is registered as a reference frame.

In step S202, a processing for calculating the object regions throughout the frame interval in which object regions exist, is executed. To execute this processing, Snakes can be utilized.

In step S203, a conversion parameter for converting a reference object region into an object region in a processing target frame (target object region) is calculated as in the case of step S102 shown in FIG. 2. This processing can be realized by a processing for obtaining an optical flow and a processing for estimating the conversion parameter from the optical flow as in the case of step S102 shown in FIG. 2. In this embodiment, however, the conversion parameter is calculated by the shape of the object region.

Specifically, the target object region is first expressed by a binary bit map.

Next, blocks are closely arranged on the contour portion of the bit map in the reference object region and moving vectors of the target object region to the bit map are calculated by template matching for each block.

The moving vectors thus obtained are used instead of the optical flow, thereby calculating the conversion parameter.

Processings in steps S204 to S208 are the same as those in steps S103 to S107 described in the first embodiment.

One example of a description format for object region data in this embodiment is the same as that in the first embodiment (FIG. 6).

Third Embodiment

The object region is expressed by the bit map, and the conversion parameter for converting the reference object region into an object region in the processing target frame (target object region) is calculated in the first and second embodiments. In the third embodiment, by contrast, an object region is approximated by an approximate figure and a conversion parameter for converting the respective representative points of the approximate figure of the reference object region into the corresponding representative points of an approximate figure of an object region in a processing target frame (target object region) are calculated. The third embodiment is the same as the first and second embodiments except for the parts corresponding to the above difference. Accordingly, description will be given hereinafter while focusing on the difference of the third embodiment from the first and second embodiments.

Figure 8:
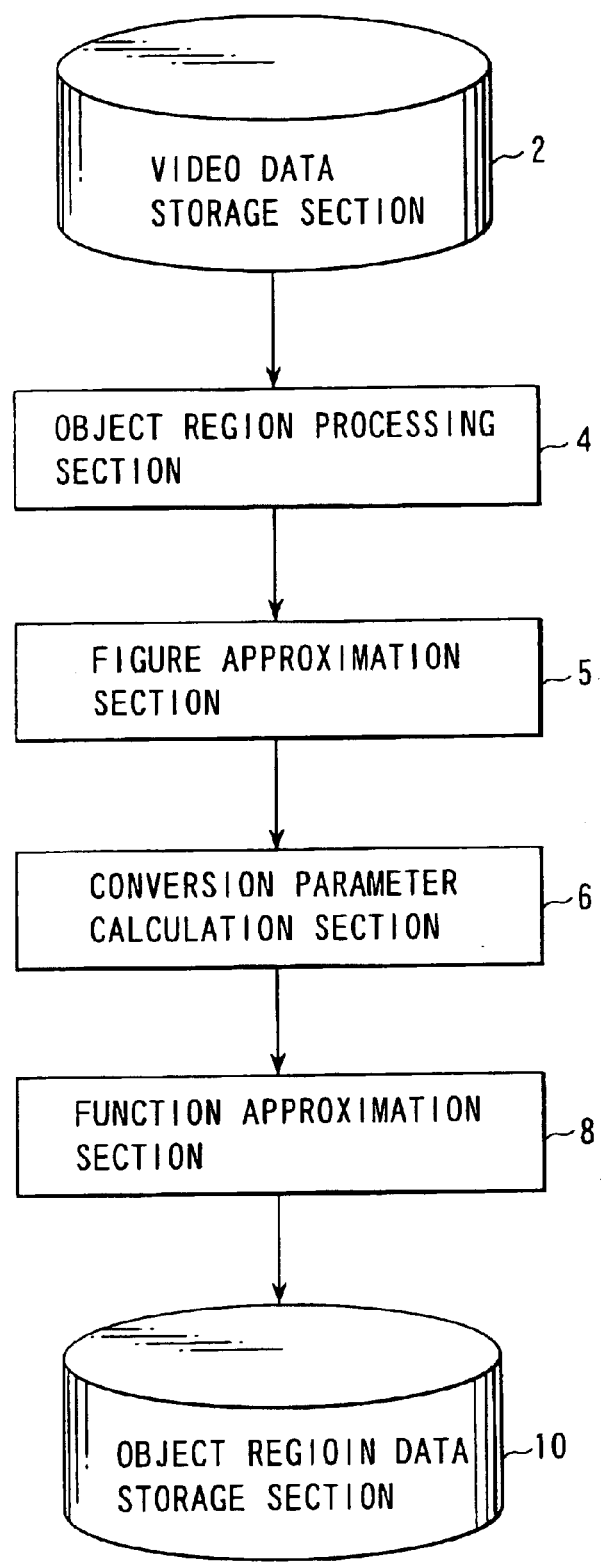
FIG. 8 shows an example of the constitution of the object region data generating apparatus in a third embodiment.

FIG. 8 shows an example of the constitution of an object region data generating apparatus in this embodiment. As shown in FIG. 8, this object region data generating apparatus is comprised of the video data storage section 2, object region processing section 4, a figure approximation section 5, the conversion parameter processing section 7, function approximation section 8, and object region data storage section 10. If processings executed by the generating apparatus are intervened by the operation of a user, a GUI for displaying video (moving image) data in, for example, units of frames and for receiving the input of a user's command and the like is employed (GUI is not shown in FIG. 8).

The figure approximation section 5 executes a processing for approximating an object region by an approximate figure and obtaining the representative points of the approximate figure.

The conversion parameter calculation section 6 calculates conversion parameters for converting the representative points of the approximate figure of a reference object region in a reference frame serving as a reference into the representative points of the approximate figure of a target object region in a target frame.

The function approximation section 8 approximates the time series trajectory of each of the conversion parameters for the representative points of the approximate figure of the object region to a time function. As in the case of the first and second embodiments, this function approximation section 8 is not necessary if the conversion parameters themselves are described.

Needless to say, this object region data generating apparatus can be realized by executing a software on a computer.

Figure 9:
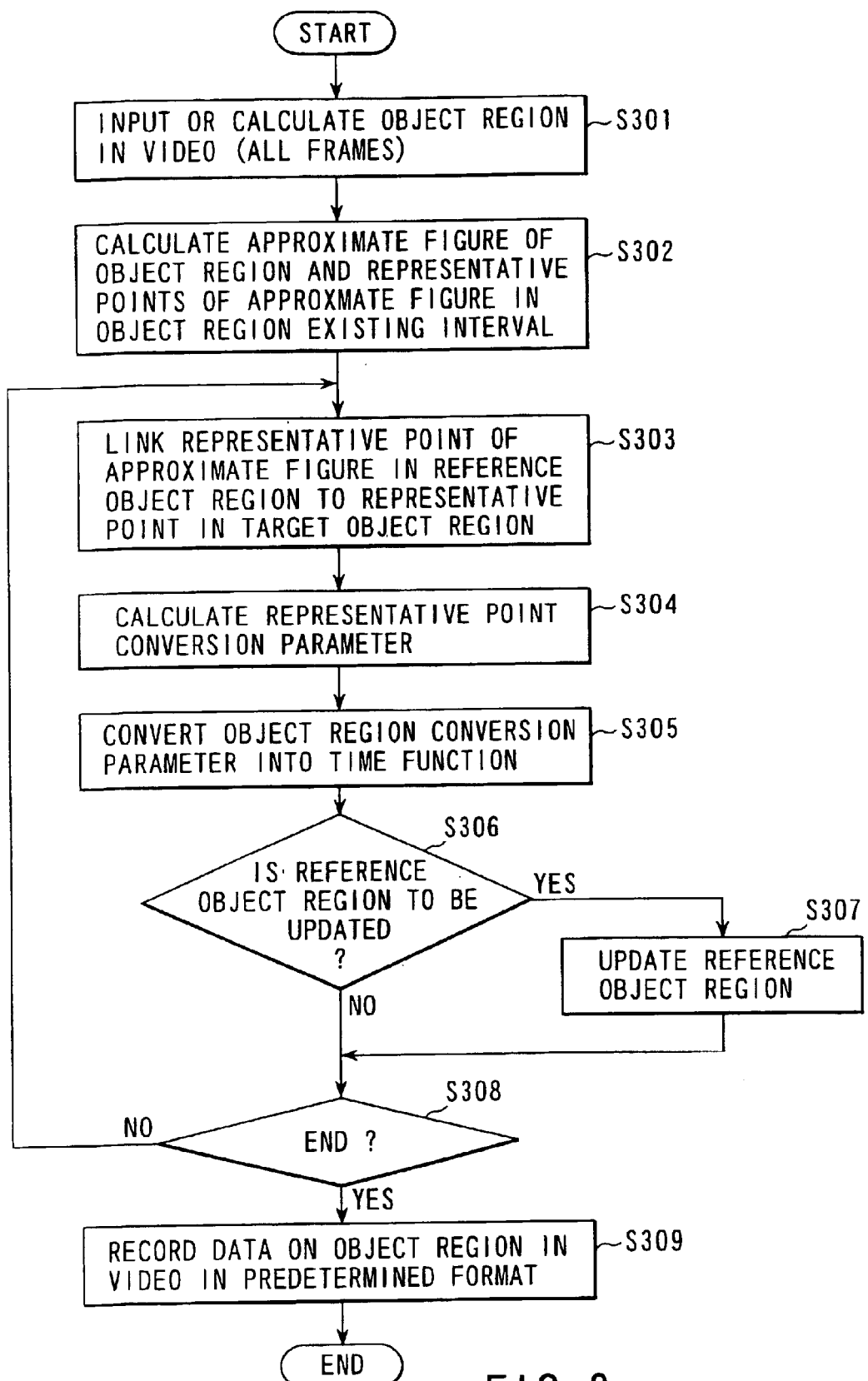
FIG. 9 is a flow chart showing another example of processing procedure in the third embodiment.

FIG. 9 shows one example of processing procedure for the object region data generating apparatus in this embodiment.

A step S301 is the same as step S101 in FIG. 2 or steps S201 and S202 in FIG. 7. In step S302, object regions are approximated by preset figures throughout the interval in which object regions exist.

The processing for calculating the object region can be executed in the same manner as that of step S202 in FIG. 7.

In the processing for approximating the object region by a figure, an approximate region as small as possible to surround the object region is found. As figure used for approximation, various figures such as a rectangle (a square, a rectangle), a parallelogram with or without gradient, an ellipse (including a circle) and a polygon with or without gradient, can be employed. In addition, as the region approximation method, various methods such as a method of approximating a region by a circumscribed figure of the region, a method of approximating a region by an inscribed figure of the region, a method of setting the center of gravity of the region to the center of gravity of an approximate figure, a method of making the areas of the region and the approximate figure equal and a method of minimizing the area of a portion on which the region and an approximate figure do not overlap each other, may be employed.

Instead of approximating the object region to a preset figure, the type of a figure can be specified by a user for each target object. Alternatively, the type of a figure can be automatically selected according to the shape or the like of the object for each target object.

Furthermore, the processing for obtaining the approximate figure of the object region may be executed for each frame or executed by object regions in several frames before and after the target frame. In the latter case, the changes of the size and position of the approximate figure are smoothed among several frames, thereby making it possible to smooth the movement or deformation of the approximate figure or to make the extraction error of the object region inconspicuous. It is noted that the size of the approximate figure may vary according to the frame.

If the approximate figure of the object region is obtained, a processing for extracting representative points expressing this approximate figure is executed. Which points are used as representative points depends on which type of an approximate figure is used. If the approximate figure is, for example, a rectangle, four or three vertexes may be set at representative points. If the approximate figure is a circle, the center and one circumferential point or both end points of the diameter may be used as representative points.

Further, if the approximate figure is an ellipse, the vertexes of the circumscribed rectangle of the ellipse, or two focuses and one point on the ellipse (e.g., one point on the short axis of the ellipse) may be used as representative points. If the approximate figure is an arbitrary closed polygon, it is necessary to use the respective vertexes of the polygon as representative points.

The representative points are extracted in units of frames every time an approximate figure for one frame is obtained. The respective representative points are expressed by a horizontal coordinate x and a vertical coordinate y.

Figure 10:
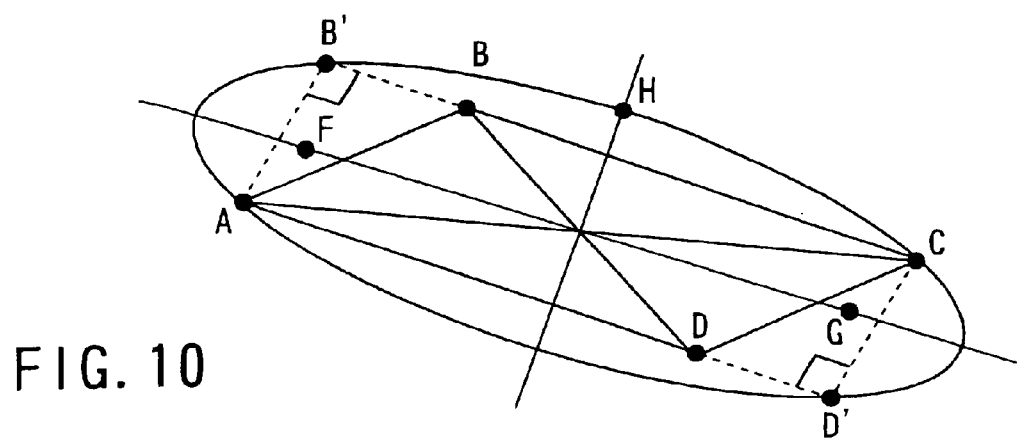
FIG. 10 is an explanatory view for an example of approximating the object region by an ellipse.

FIG. 10 shows one example of a method of obtaining an approximate ellipse if the object region is expressed by a parallelogram. Points A, B, C and D shown in FIG. 10 are the respective vertexes of the parallelogram which is the object region. In this case, a calculation is first made to determine which is longer, side AB and side BC. Thereafter, a minimum rectangle having the longer side and an opposite side as part of the sides thereof is obtained. In case of FIG. 10, a rectangle having four vertexes of points A, B', C and D' is obtained. It is assumed, for example, an approximate ellipse is a circumscribed ellipse which is analogous to the inscribed ellipse of this rectangle and which passes the points A, B', C and D'.

Figure 11:
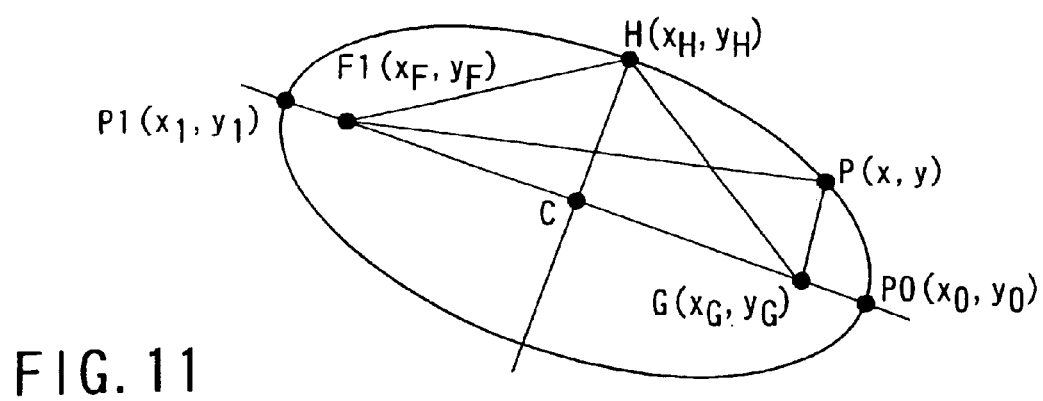
FIG. 11 is an explanatory view for an example of obtaining the representative points of the approximate ellipse of the object region.

Next, if it is assumed that the representative points of the figure expressing the ellipse are two focuses and one point on one ellipse, the focuses of the ellipse can be easily obtained from two points on the axis and the circumscribed rectangle of the ellipse. Here, a method of obtaining focuses F and G from two points P0, P1 on the longer axis of the ellipse and one point H on the shorter axis thereof shown in FIG. 11 by way of example.

First, parameters "a" and "b" for the longer axis and the shorter axis, the center C of the ellipse and ellipticity are obtained as follows:

$E(P_0, P_1) = 2 \times a$ $C = (P_0 + P_1)/2$ $E(C, H) = b$ $e = (1/a) \times \sqrt{a \times a - b \times b}$ E(P, Q) is the Euclidean distance between points P and Q.

Using the parameters thus obtained, focuses F and G can be obtained as follows:

$F = C + e \times (P_0 - C)$ $G = C - e \times (P_0 - C)$

In this way, the representative points F, G and H of the ellipse are determined. If these points are coupled with those of an ellipse taken out in another frame, ambiguity occurs. That is, there are two combinations to couple the two extracted focuses with those in one frame before this frame. Further, since there are two intersections between the shorter axis and the ellipse, it is impossible to know which intersection corresponds to one extracted point on the ellipse. Considering this, a determination method will be described.

It is assumed that two focuses extracted one frame before are $F_P$ and $G_P$. To determine which corresponds to the focus $F_P$, F or G, a comparison are made between $E((G_P - F_P)/2, (G-F)/2)$ and $E((G_P - F_P)/2, (F-G)/2)$.

If the former is smaller, $F_P$ is made to correspond to F and $G_P$ is made to correspond to G. If the latter is smaller, on the other hand, $F_P$ is made to correspond to G and $G_P$ is made to correspond to F.

Additionally, the intersection between a shorter axis and an ellipse in one preceding frame is assumed as $H_p$, and two intersections between the shorter axis and the ellipse in a current frame are H, H'. Which to select as a point corresponding to $H_P$, H or H', is determined by calculating the following two distances:

$E(H_P - (G_P + F_P)/2, H - (F+G)/2)$ and $E(H_P - (G_P + F_P)/2, H' - (F+G)/2)$.

If the former distance is shorter, the intersection H is selected, and if not, the intersection H' is selected. It is noted that the intersection H between the shorter axis and the ellipse in the first frame may be selected from these two intersections.

Next, description will be given to a case of using a figure other than the ellipse as an approximate figure.

Figure 12:
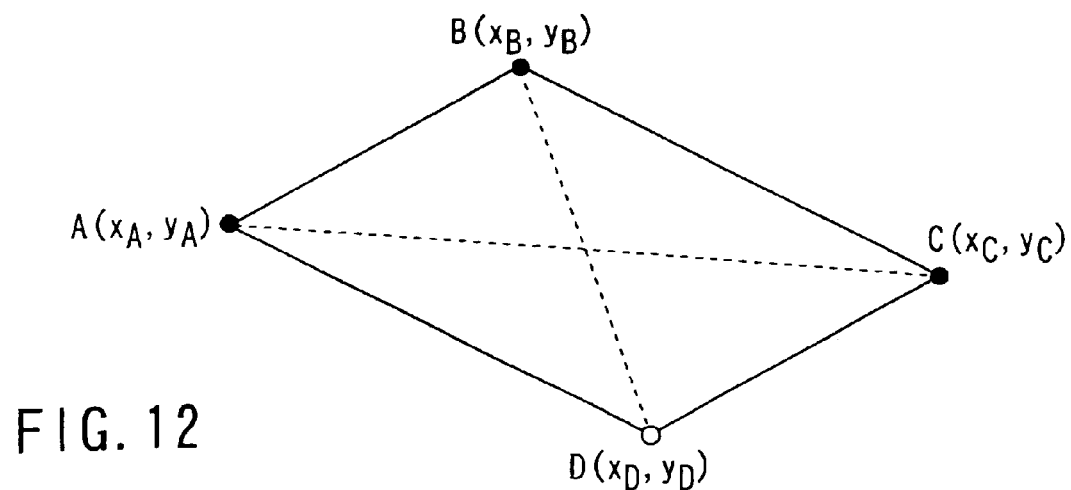
FIG. 12 is an explanatory view for an example of representative points if the approximate figure is a parallelogram.

FIG. 12 is a view for explaining representative points if a parallelogram is used as an approximate figure. Points A, B, C and D are the vertexes of the parallelogram. If three points out of the four points are determined, the remaining one point is determined unconditionally. Thus, it suffices to use three vertexes among the four vertexes as representative points. In the example of FIG. 12, the three points of A, B and C are representative points.

Figure 13:
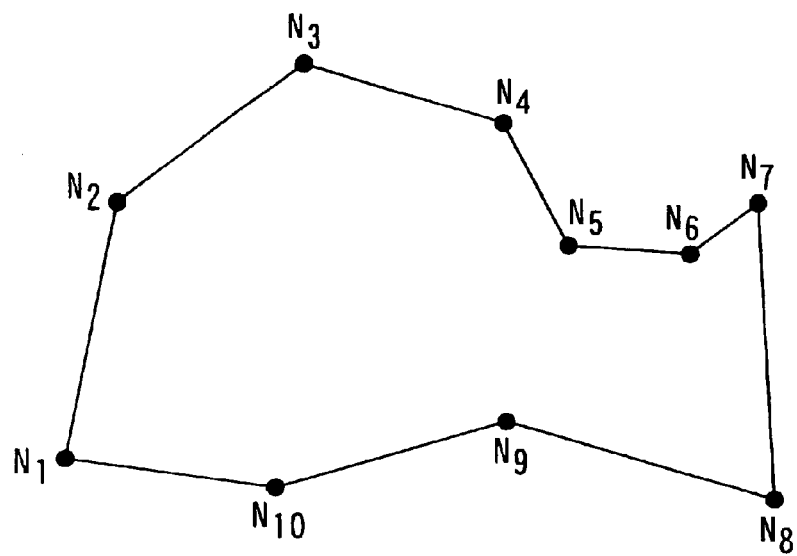
FIG. 13 is an explanatory view for an example of representative points if the approximate figure is a polygon.

Further, FIG. 13 is a view for explaining representative points if a polygon is used as an approximate figure. In case of a polygon, the order of vertexes are set along an outer circumference. In the example of FIG. 13, since the polygon has ten vertexes, all of the vertexes from $N_1$ to $N_{10}$ are representative points. In this case, the number of vertexes may be reduced by only the vertexes having an interior angle of 180 degree or less as representative points.

Figure 14A:
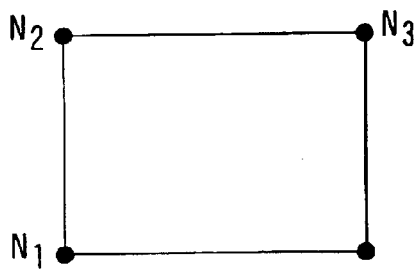
FIGS. 14A, 14B, 14C and 14D show examples of the approximate figures of the object region and representative points.
Figure 14B:
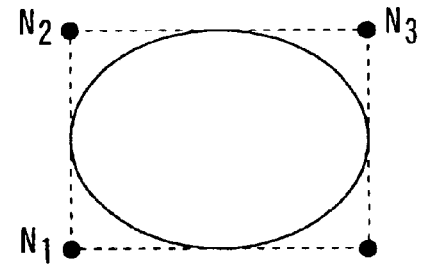
Figures 14C, 14D:
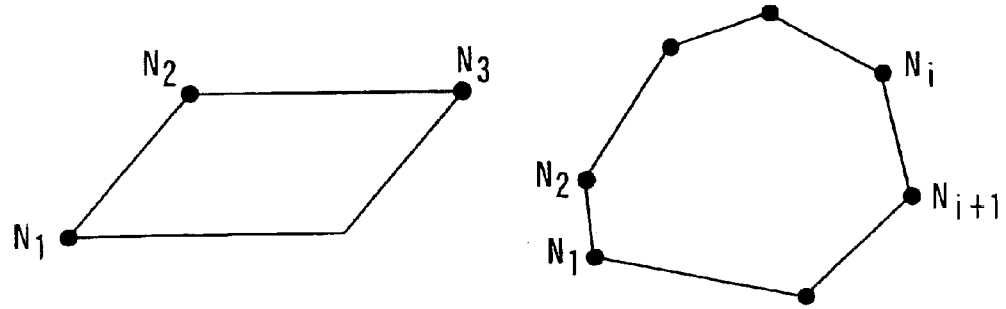

As described above, the approximate figure can be expressed by a collection of representative points which specify the figure. FIGS. 14A to 14D show examples of the representative points of several types of figures. FIG. 14A shows a rectangle, FIG. 14B shows an ellipse, FIG. 14C shows a parallelogram and FIG. 14D shows a polygon. In FIGS. 14A to 14D, black circles denote representative points.

Here, it is preferable that the representative points of the approximate figure are ordered so as to clarify the positional relationship among the points. In the examples of FIGS. 14A to 14D, orders are indicated by numbers, respectively. The representative points of each of the rectangle and the parallelogram are three vertexes among four vertexes (which are ordered clockwise). In addition, the ellipse has the representative points (ordered clockwise) of a circumscribed rectangle thereof, and the polygon has all vertexes (ordered clockwise) as representative points.

Further, it is possible to express a region having a vacant space inside. FIG. 15 shows one example of how to express such a region. In FIG. 15, a region having a vacant space inside is expressed by two polygons. The representative points of the figures are vertexes of the outer and inner polygons. In this case, the vertexes of the outer polygon are ordered clockwise, whereas those of the inner polygon are ordered counterclockwise. By doing so, it is possible to set the right side in the forward direction of the representative points as an object region and to easily determine whether the inside of the polygon is an object or the outside thereof is an object.

Needless to say, the vertexes of the outer polygon may be ordered counterclockwise and those of the inner polygon may be ordered clockwise. In that case, the left side in the forward direction of the representative points is an object region.

Next, in step S302, a reference object region and a reference frame are set. In this embodiment, the reference object region is the approximate figure of an object region in the first frame (reference frame) in an object region existing time-interval. The positions of the representative points of the reference region approximate figure are stored, as well.

Next, in step S303, the representative points of approximate figure of the object region in a processing target frame are made to correspond to those of the approximate figure of the reference object region.

FIG. 16 shows one example of how to make the former representative points correspond to the latter representative points. In FIG. 16, reference symbol 1000 denotes the centers of gravity of approximate rectangles. In FIG. 16, the approximate FIG. 1001 of the reference object region and the approximate FIG. 1002 of the target object region are obtained.

First, either the approximate FIG. 1001 or 1002 is moved in parallel, to thereby make the positions of the centers of gravity of the both FIGS. 1001 and 1002 coincident with each other (FIG. 16 shows a state in which the positions of the centers of gravity are coincident with each other).

Thereafter, distances d1 to d4 between the four vertexes of the FIG. 1001 and those of the FIG. 1002 are calculated, respectively and the sums of the distances are obtained from all combinations of the vertexes.

Among them, a combination having the smallest sum of distances is obtained and the representative points of the combination are made to correspond to one another.

It is noted that there are cases where it is difficult to make the representative points of the approximate figure of the object region correspond to those of the approximate figure of the reference object region in this method. For example, if an approximate rectangle is close to a square and rotates by 45 degrees, it is difficult to make the representative points of the approximate figure of the object region correspond to those of the approximate figure of the reference object region (since the sum of distances is almost equal between the two combinations). In that case, therefore, a method including obtaining the exclusive OR of the object regions in the approximate figures, and adopting a combination having the smallest area of the figures, or a method including obtaining the absolute difference in texture between object regions and obtaining a combination having a smallest difference value.

In step S304, conversion parameters are calculated from the moving vectors of the representative points of the approximate figure of the object region.

In this processing, the movements of the representative points are used instead of an optical flow and conversion parameters are thereby calculated by the same processing as that of step S102 shown in FIG. 2. In this case, however, due to the small number of representative points, the conversion parameters cannot be always obtained. In case of, for example, a rectangle, an ellipse and a parallelogram, each of them has three representative points but eight parameters for a projection conversion model cannot be obtained from the moving vectors of these three representative points. FIG. 17 shows the relationship between the types of figures used for approximation and conversion models for which conversion parameters can be obtained. In FIG. 17, symbol ○ denotes a combination capable of calculating parameters and symbol X denotes a combination incapable of calculating parameters.

In step S305, the conversion parameters obtained in step S304 are approximated by a time function, which processing is the same as that in step S103 shown in FIG. 2.

In step S306, it is determined whether or not it is necessary to update the reference object region. In this processing, the reference object region is first converted by the conversion parameters and a predicted object region in a current frame is calculated. Needless to say, it is possible to calculate the same predicted object region by converting only the representative points of the reference object region using the conversion parameters and constituting a figure specified by the converted representative points. Next, the error between the predicted object region and the approximate figure of the target object region in the current frame is calculated and it is determined whether or not the reference object region needs to be updated by a threshold value.

In step S307, the reference object region is actually updated after it is determined at step S306 that the reference object region needs to be updated. While setting the processing target frame as a reference frame, the approximate figure of the object region in the frame is stored as a new reference object region and the coordinate values of the representative points of the reference object region are stored, as well.

In step S308, it is determined whether or not the description of the object region in the video is ended as in the case of step S106 shown in FIG. 2.

In step S309, information on the object region (function parameters approximating the conversion parameters) calculated as in the same manner as that of step S107 shown in FIG. 7 is recorded in a predetermined description format.

Figure 18:
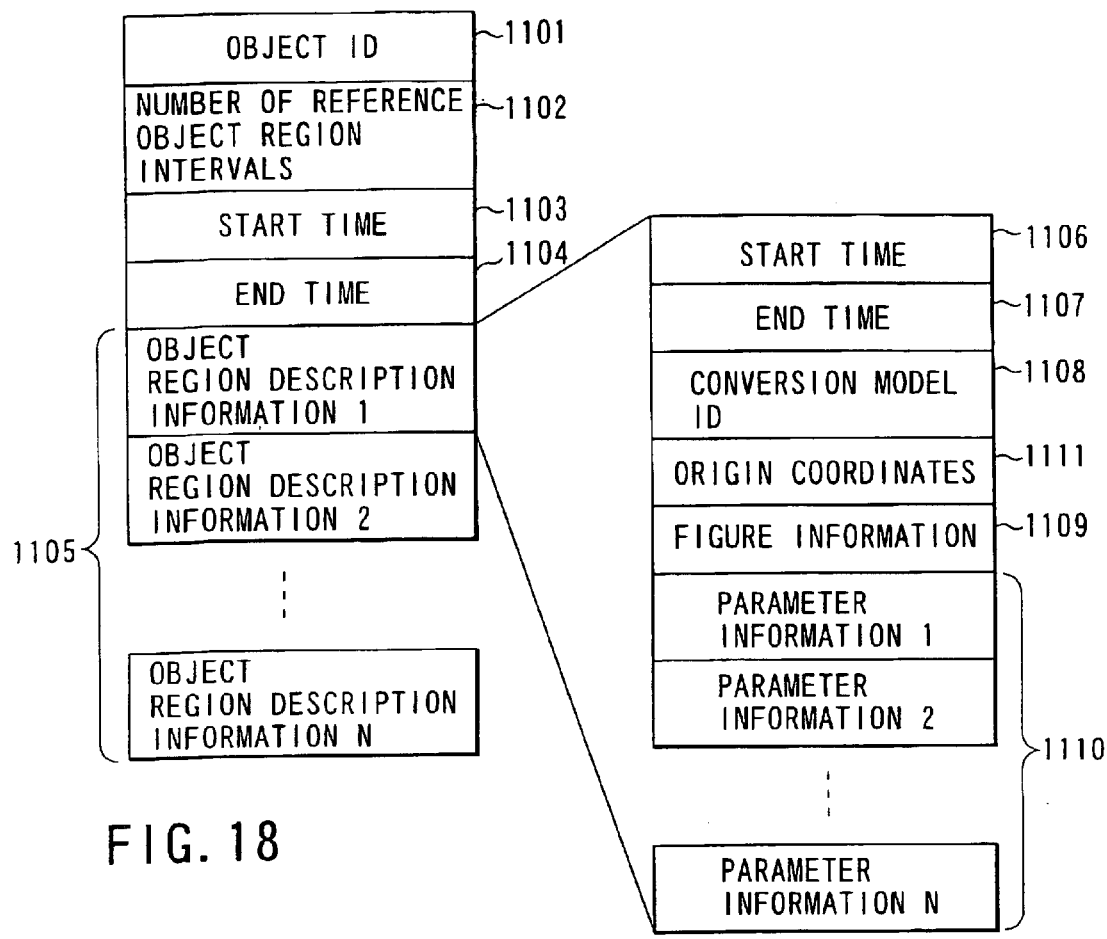
FIG. 18 shows one example of a description format for the object region data if the reference object region is approximated by a figure.

FIG. 18 shows one example of a description format for the object region data. This description format is the same as that shown in FIG. 6 except for figure information 1109. The figure information 1109 used instead of the reference object region information 509 shown in FIG. 6 is comprised of an ID specifying a figure type and the coordinates of the representative points of the approximate figure of the reference object region. Symbol M denotes the number of representative points necessary for a figure specified by the ID.

The approximate figure of the object region is not specially limited in the above description. As variation of the approximate figure of the object region, an approximation method approximating the object region by a rectangle will be described hereinafter.

Figure 19:
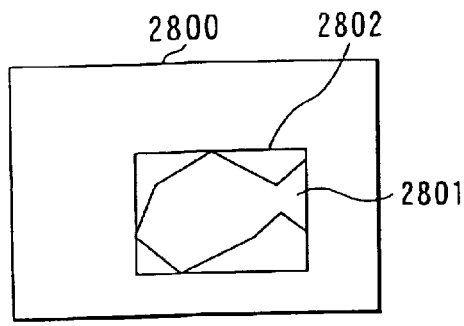
FIG. 19 shows a state in which an object is approximated by a rectangle.

As for a circumscribed rectangle 2802 of an object region 2801 in a frame 2800 as shown in FIG. 19, for example, procedures for subjecting the bit map of the object region to raster scan, updating minimum values for coordinates x and y if they are smaller than those stored so far and updating maximum values therefor if they are larger than the maximum values stored so far while a target pixel is within the object region, are repeatedly executed for the entire pixels, thereby obtaining the minimum and maximum values of the pixel positions indicating the object region for the coordinates x and y, respectively. Consequently, the four vertexes of the rectangle 2802 can be easily obtained.

Figure 20:
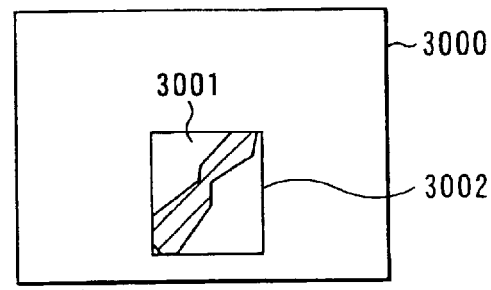
FIG. 20 shows a state in which an oblong object with gradient is approximated by a rectangle without gradient.

The above-described method is excellent in that it is easy to execute. However, particularly when an oblong object 3001 exists while being inclined with respect to an image screen 3000 as shown in FIG. 20, for example, many non-object regions are contained in an approximate rectangle 3002. Furthermore, when the oblong object rotates, the size and shape of the rectangle 3002 change accordingly. These respects may possibly be disadvantageous in specifying an object.

Considering the above disadvantage, one example of an approximation method capable of making a rectangle as small as possible (making non-object regions in the approximate rectangle as few as possible) and reflecting the attitude of a target object, will now be described.

Figure 21A:
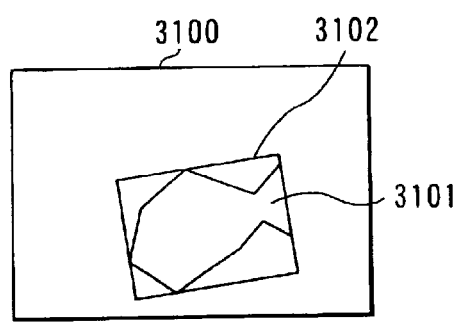
FIGS. 21A and 21B show states in which an object is approximated by a rectangle with gradient according to the gradient of the object.

In FIG. 21A, reference symbol 3100 denotes one frame in a video as a processing target frame.

Reference symbol 3101 denotes the region of an object which is an extraction target.

Reference symbol 3102 denotes the approximate rectangle of the object region. Unlike the rectangle 2802 shown in FIG. 19, this approximate figure has a gradient. Also, a non-object region is small in the rectangle and the shape of the rectangle remains constant even if the target rotates.

Figure 22:
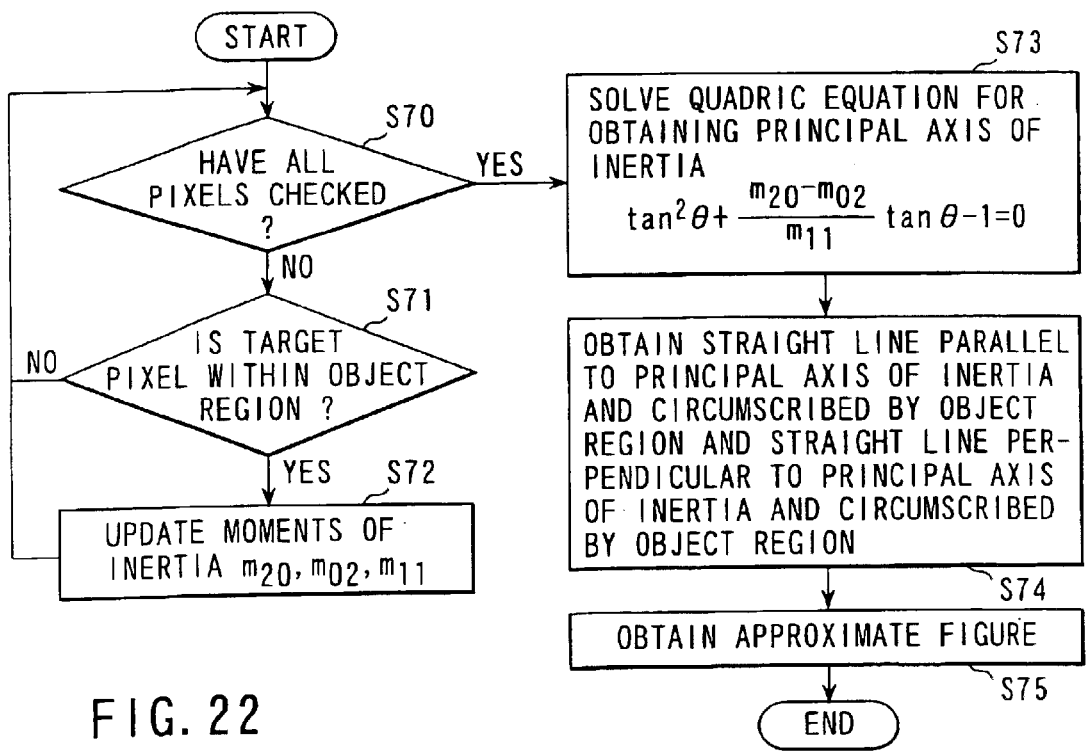
FIG. 22 is a flow chart showing one example of processing procedure for obtaining an approximate rectangle.

FIG. 22 shows one example of processing procedure in this case. In the exemplified processing procedure, the principal axis of inertia of the target object region is obtained and an approximate figure is obtained based on the principal axis of inertia thus obtained.

Figure 21B:
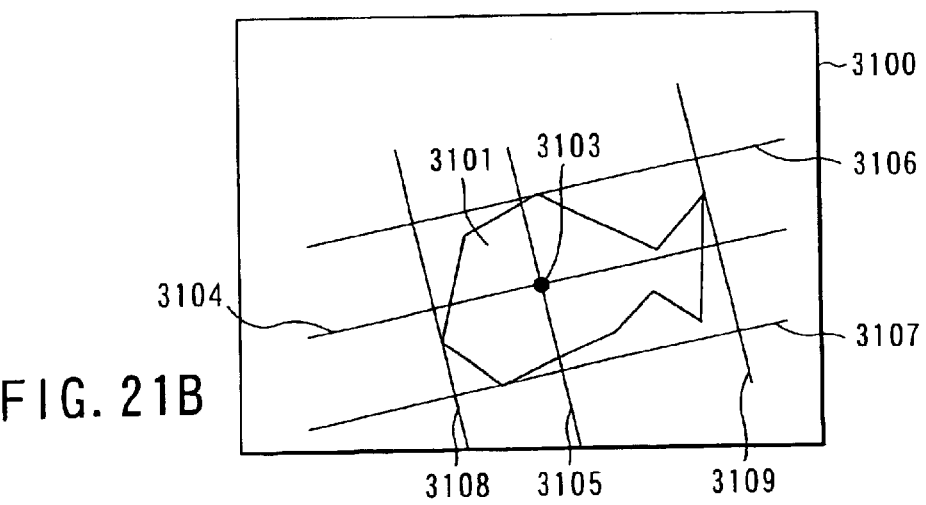

In FIG. 21B, reference symbol 3103 denotes the center of gravity of the target object region.

Reference symbol 3104 denotes the principal axis of inertia of the target object region. Reference symbol 3105 denotes a straight line perpendicular to the axis 3104.

Assuming that the mask image is f(x, y), f(x, y) is "1" in the object region and "0" on the outside of the object region. The inertia moment of the object region can be expressed as follows:

$$m_{ij} = \Sigma\Sigma x^i y^j f(x, y)$$

Initially, inertia moments $m_{20}$, $m_{02}$ and $m_{11}$ of the object region are obtained (steps S70 to S72).

The inertia moment of f(x, y) with respect to a straight line y=x tan θ passing through the origin (i.e., centroid) is obtained as follows:

$$m_\theta = \int\int (x \sin\theta - y \cos\theta)^2 f(x, y) \, dx \, dy$$

An assumption is made that the angle with which $m_\theta$ is minimized when θ has been changed is $\theta_0$. When only one set of angles exists, the straight line y=x tan $\theta_0$ is called the principal axis of inertia.

Note that tan $\theta_0$ can be obtained as a solution of the following quadratic equation:

$$\tan^2\theta + \{(m_{20}-m_{02})/m_{11}\}\tan\theta - 1 = 0$$

When tan $\theta_0$ is obtained around the centroid 3103, the related information of the object can be obtained (step S73).

Then, a straight line in parallel with the principal axis of inertia and circumscribing the object region and a straight line perpendicular to the principal axis of inertia and circumscribing the object region are obtained (step S74).

Referring to FIG. 21B, straight lines 3106 and 3107 are in parallel with the principal axis of inertia 3104. The straight lines 3106 and 3107 circumscribes the object region.

Straight lines 3108 and 3109 are straight lines in parallel with the straight line 3105, the straight lines 3108 and 3109 circumscribing the object region.

The rectangle 3102 is formed by the straight lines 3106, 3107, 3108 and 3109 (step S75).

When the object is formed into a circle, the principal axis of inertia cannot be obtained. In the foregoing case, procedures for subjecting the bit map of the object region to raster scan, updating minimum values for coordinates x and y if they are smaller than those stored so far and updating maximum values therefor if they are larger than the maximum values stored so far while a target pixel is within the object region, are repeatedly executed for the entire pixels, thereby obtaining the minimum and maximum values of the pixel positions indicating the object region for the coordinates x and y, respectively, as shown in FIG. 19.

Figure 23:
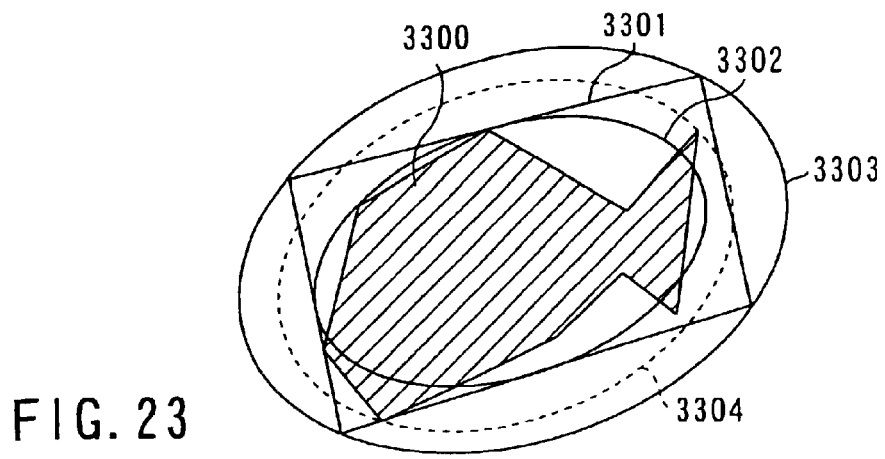
FIG. 23 is an explanatory view for a method of obtaining an approximate ellipse from an appropriate rectangle.
Figure 24:
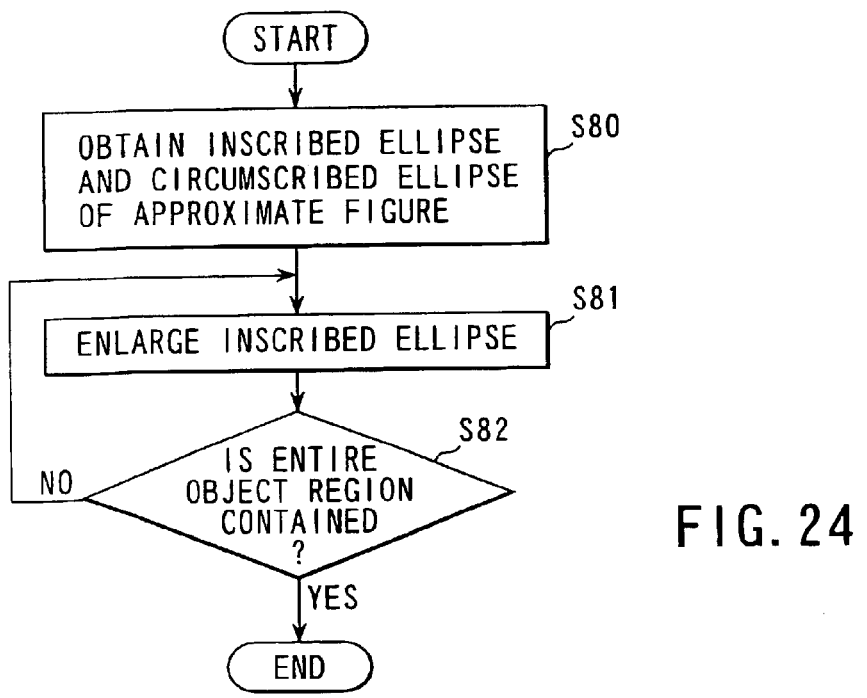
FIG. 24 is a flow chart showing one example of processing procedure for obtaining an approximate ellipse from an appropriate rectangle.

The object region can sometimes more satisfactorily be expressed by an ellipse as compared with expression by the rectangle. FIG. 23 shows an example of a method of an approximate ellipse from a rectangle when the object region is expressed with the rectangle. FIG. 24 shows an example of a process employed in the foregoing case.

Referring to FIG. 23, an assumption is made that an object region 3300 and a circumscribing rectangle 3301 have been obtained.

Initially, the inscribing ellipse and the circumscribing ellipse of the approximate rectangle 3301 are obtained (step S80).

Referring to FIG. 23, an ellipse 3302 is an inscribing ellipse of the rectangle 3301 and the ellipse 3303 is an circumscribing ellipse of the rectangle 3301.

Then, the size of the inscribing ellipse 3302 is gradually brought closer to that of the circumscribing ellipse 3303 (step S81). Then, an ellipse 3304 for completely including the object region 3300 is obtained (step S82) to employ the ellipse 3304 as the approximate ellipse. The unit for enlarging the size of the inscribing ellipse 3302 in each process of the repeated process may previously be determined. The unit may be determined in accordance with the difference between the size of the inscribing ellipse 3302 and that of the circumscribing ellipse 3303.

A reverse method may be employed with which the size of the circumscribing ellipse 3303 is brought closer to the size of the inscribing ellipse 3302. In the foregoing case, the circumscribing ellipse 3303 includes the object region 3300 from the first. Therefore, the ellipse previous to the ellipse with which the portion which is not included in the object region 3300 has first occurred in the repeated process is required to be the approximate ellipse 3304.

In the above-described processings, an ellipse containing the entire object region is obtained. Alternatively, an approximate figure may be obtained while minimizing the area of a region portion in which the region of the object region and that of the approximate ellipse do not overlap each other.

Next, the representative points of the approximate rectangle or the approximate ellipse are obtained. Four or three vertexes can be set as the representative points of the rectangle. In case of the ellipse, the vertexes of the circumscribed rectangle of the ellipse, or two focuses and one point on the ellipse can be set as representative points.

Fourth Embodiment

The above description concerns the object region data generating apparatus capable of describing a desired object region in the video with the smaller quantity of data by describing the target object region in each frame by using the conversion parameter obtained from the reference object region in the reference frame, and capable of easily generating and handling the object region data. Next, the concrete contents of the parameter information (denoted by reference symbol 510 in FIG. 6 and reference symbol 1110 in FIG. 8) in the first end third embodiments will be described.

The parameter information directly or indirectly contain the conversion parameters for the object regions in the respective frames corresponding to the reference object region. As already stated above, there are conversion parameter expression methods such as a method of expressing conversion parameter by a time function and describing information specifying the function, and a method of directly describing a conversion parameter value. In this embodiment, these expression methods and description formats for the conversion parameter for each of the methods will be described.

Figure 25:
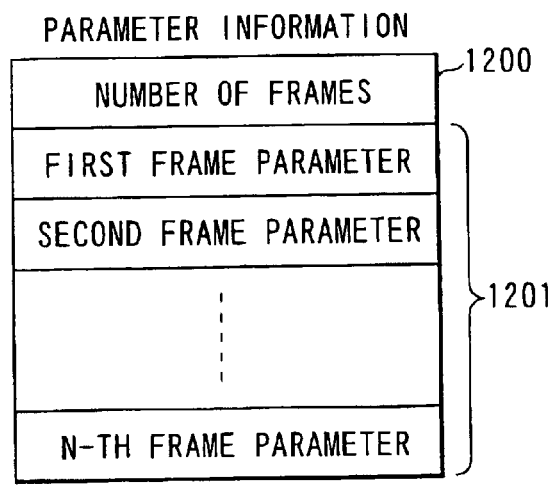
FIG. 25 shows one example of the data structure of parameter information in object region data in a fourth embodiment.

First, one example of the data structure of conversion parameter information is shown in FIG. 25.

In FIG. 25, the number of frames 1200 indicates the number of frames of an object region stored in the parameter information.

The conversion parameters for object regions in the respective frames in a constant reference object interval during which the same reference object is defined sequentially stored from the first frame as an arrangement (1201).

M items of such conversion parameter information exist per frame. In case of Affine conversion, for example, M=6.

Figure 26:
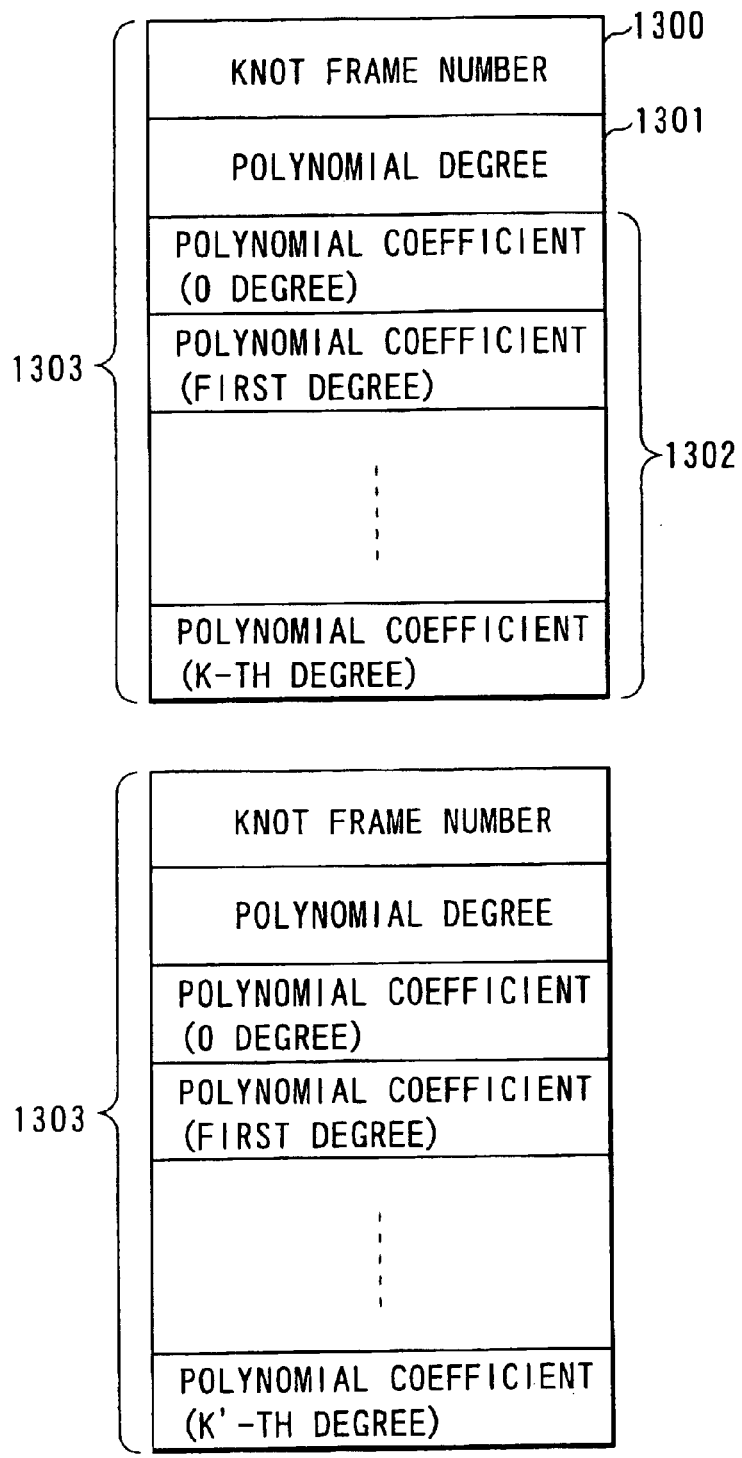
FIG. 26 shows one example of the data structure of parameter information where an approximate function is used.

Next, FIG. 26 shows one example of the data structure of conversion parameter information if conversion parameters are approximated by a function.

It is assumed that a Spline function is used to approximate conversion parameters.

A knot frame number 1300 expresses the knot of the Spline function and indicates that data 1302 on the coefficients of a polynomial are effective up to this knot. The number of coefficient data on the polynomial varies according to the highest degree of the Spline function (if the highest degree is K, the number of coefficient data is K+1). Due to this, the degree of the polynomial 1301 is referred to. The polynomial degree 1301 is followed by polynomial coefficient data 1302 which number corresponds to (polynomial degree+1).

Further, since the Spline function is expressed by different polynomials among knots, polynomials the number of which corresponds to the number of knots are required. Accordingly, data 1303 including the knot frame number 1301, polynomial coefficients 1302 and the like is described repeatedly a plurality of times. If the knot frame number is equal to the final frame in the constant reference object interval, it means that the data is the last polynomial coefficient data, thus indicating the end of conversion parameters.

Figure 27:
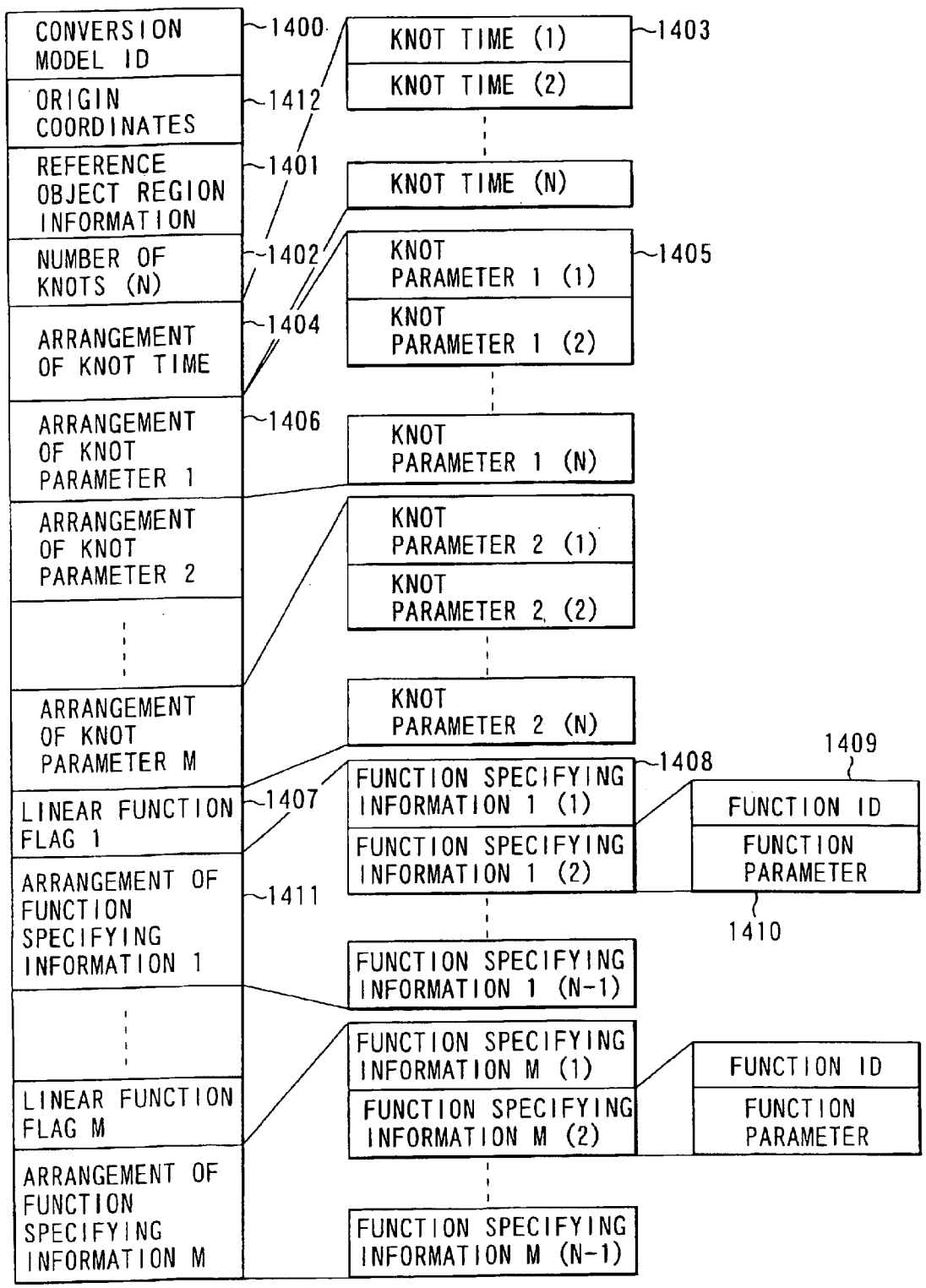
FIG. 27 shows another example of the data structure of object region description information.

Next, FIG. 27 shows another example of the data structure of object region description information if conversion parameters are approximated by a function. In this example, it is assumed that the highest degree of a polynomial is the second degree.

All of the coefficients of the polynomial Spline function are described in the above-described examples (FIGS. 6 and 26), whereas combinations of the coordinates of the knots of the Spline function and values relating to the coefficients of the second degree of the Spline function are described in this example. This method is advantageous in that a rough object trajectory can be easily grasped since knots can be easily taken out.

A conversion model ID 1400 specifies the type of a conversion model used to approximate the movement of an object. For example, the conversion model ID 1400 can designate Affine conversion or projection conversion. Origin coordinates 1412 specify which point in an image is set as an origin if conversion is made according to the conversion model.

Reference object region information 1401 stores information on the description of the shape of a reference object region as in the case of the above-described example (505 in FIG. 6).

The number of knots (N) 1402 represents the number of the knots of a Spline function. A frame corresponding to each knot is expressed by a time and stored in a knot time 1403. The number of knot times corresponds to the number of knots, so that they are described as an arrangement 1404.

Likewise, the conversion parameters 1405 for each knot are described as an arrangement 1406. The number of arrangements is M corresponding to the number of the parameters (M=6 in case of Affine conversion).

A linear function flag 1407 represents whether only linear functions are used as the Spline function among knots. If polynomials of second degree or higher are used even partially, this flag 1407 is turned off. Use of this flag is advantages in that the quantity of data can be reduced since it is not necessary to describe any function specification information 1408 to be described later, if only the linear functions are used as approximate functions. It is noted that the flag 1407 is not always required.

Figures 28, 31:
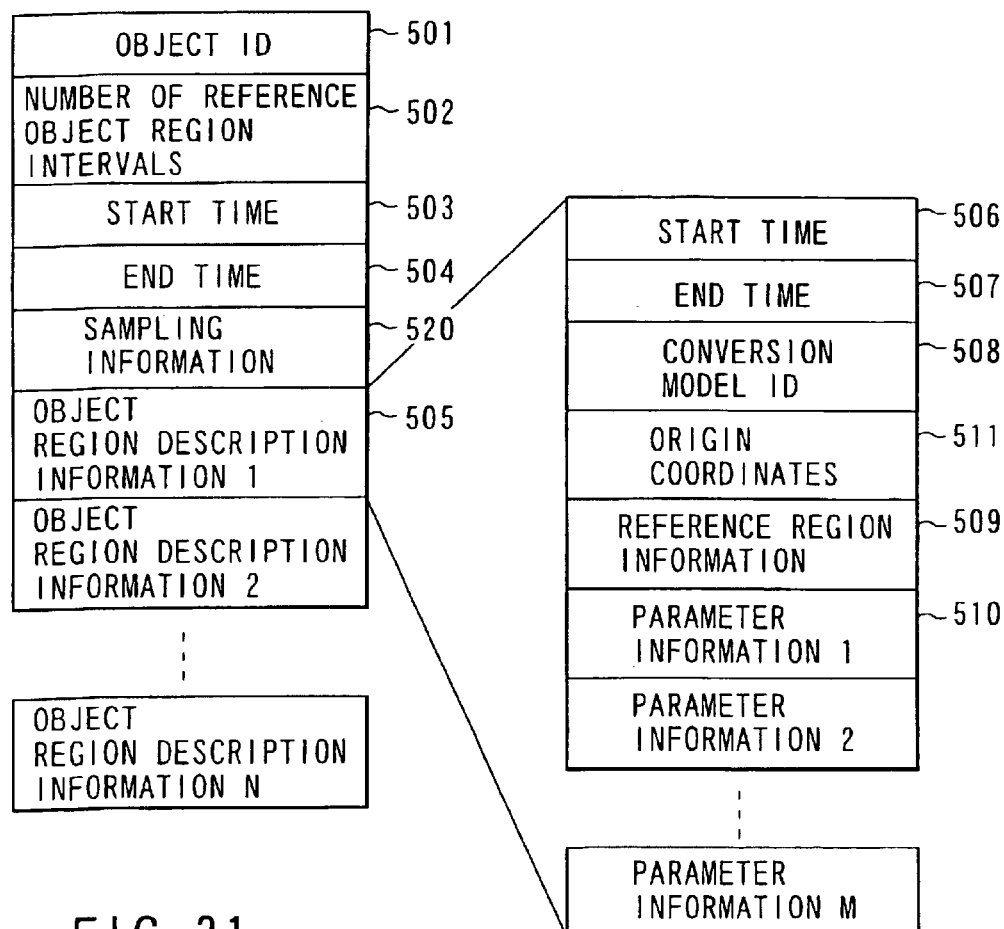
FIG. 28 shows one example of the correspondence among function ID, type of function, function parameter, and limit condition.
FIG. 31 shows one example of the description format of object region data including sampling information.

A function ID 1409 and a function parameter 1410 which are contained in the function specifying information 1408, represent the degree of a polynomial Spline function and information for specifying the coefficients of the function, respectively. FIG. 28 shows one example of the function ID 1409 and the function parameter 1410. In FIG. 28, symbols ta and tb denote times of continuous knots, symbol f(t) denotes a Spline function in an interval [ta, tb], and symbols fa and fb denote the conversion parameters for the knots at times ta and tb, respectively. If a first-degree polynomial is used, only the information on knots suffices and function parameters are not, therefore, described. If a second-degree polynomial is used, however, one value $a_a$ is described in a function parameter as information for specifying coefficients. In the example of FIG. 28, the coefficients of the second degree are used. It is also possible to use other values such as one point other than fa and fb on a quadratic curve.

According to the description method in this embodiment, it is possible to reproduce Spline functions in all intervals using limit conditions shown in FIG. 28 based on the knot information and the function parameter information.

The number of function specifying information is {(the number of knots)−1} and they are described as an arrangement 1411.

In the above-described example, description has been given while assuming that the highest degree of the polynomial is the second degree. Needless to say, the highest degree of the polynomial can be set to be third degree or higher.

Figure 29:
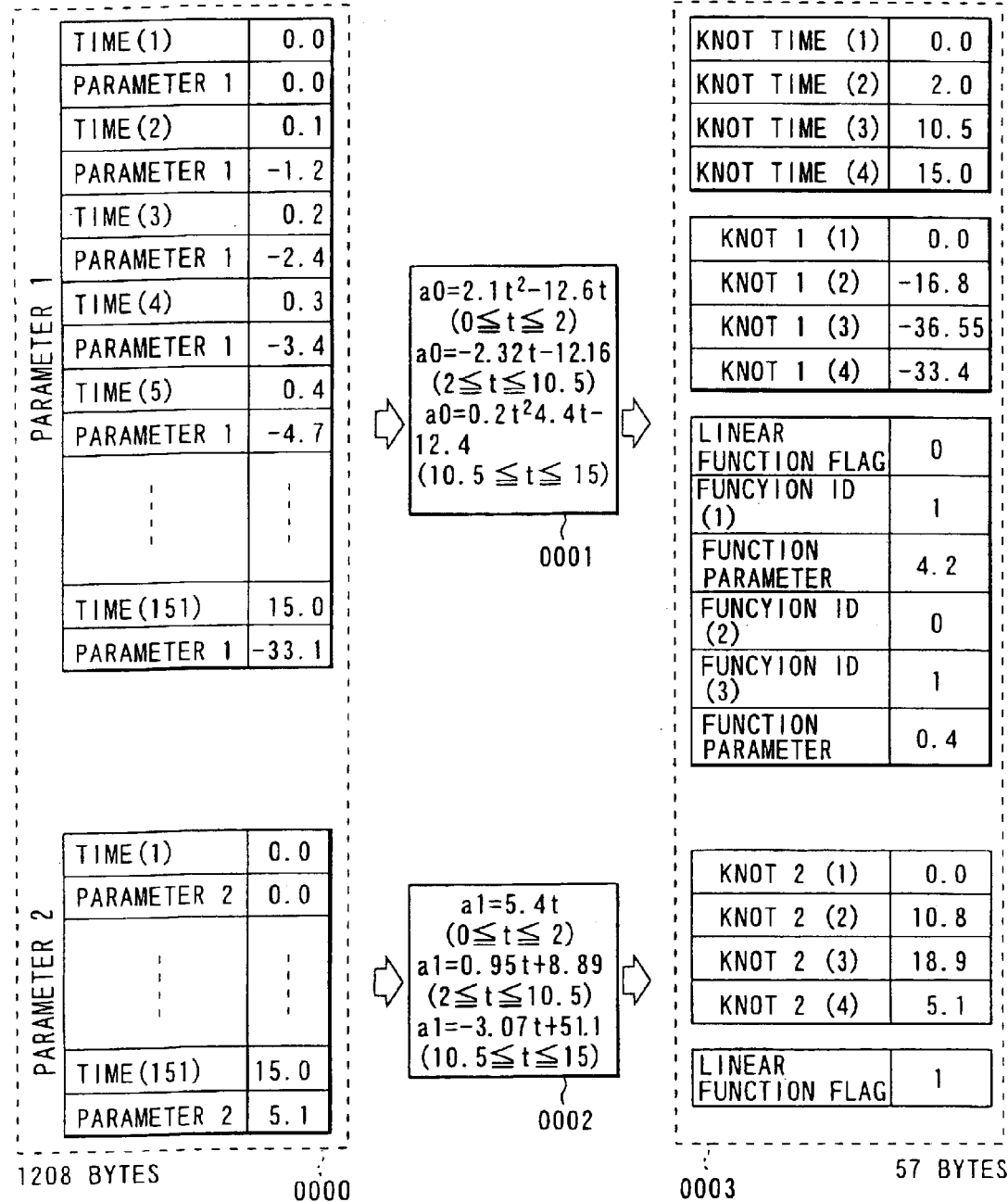
FIG. 29 is a diagram showing a specific example of the structure of data about a trajecory of representative points.

Next, effect of the data description of FIG. 27 according to the present invention will be explained using a specific example of data description with reference to FIG. 29. FIG. 29 is a diagram comparing a description 0000 merely describing a trajectory of the representative points according to the description format of FIG. 25 and a description 0003 describing a trajectory of the representative points in an arrangement structure using the data structure of the present invention (FIG. 27). Note that a time stamp is added to the parameter 1201 in the description 0001 in order to easily understand. Both the two descriptions are an example of a parallel translation model and describe the trajectory of the conversion parameters $a_0$ and $a_1$. In description 0000, the conversion parameters $a_0$ from time 0.0 (sec.) to 15.0 (sec.) are described for every 0.1 (sec.). These parameter values are calculated by processes of the conversion parameter calculation section 6 or steps S102, S203 or S304. Since two parameters $a_0$ and $a_1$ are included, parameter values of 2×151=302 have been stored in a memory in the parameter value data arrangement 0000. In a case that the respective values are represented with data of 4 bytes, a memory capacity of 1208 bytes is required for storage of the parameter value data arrangement 0000.

Figure 30:
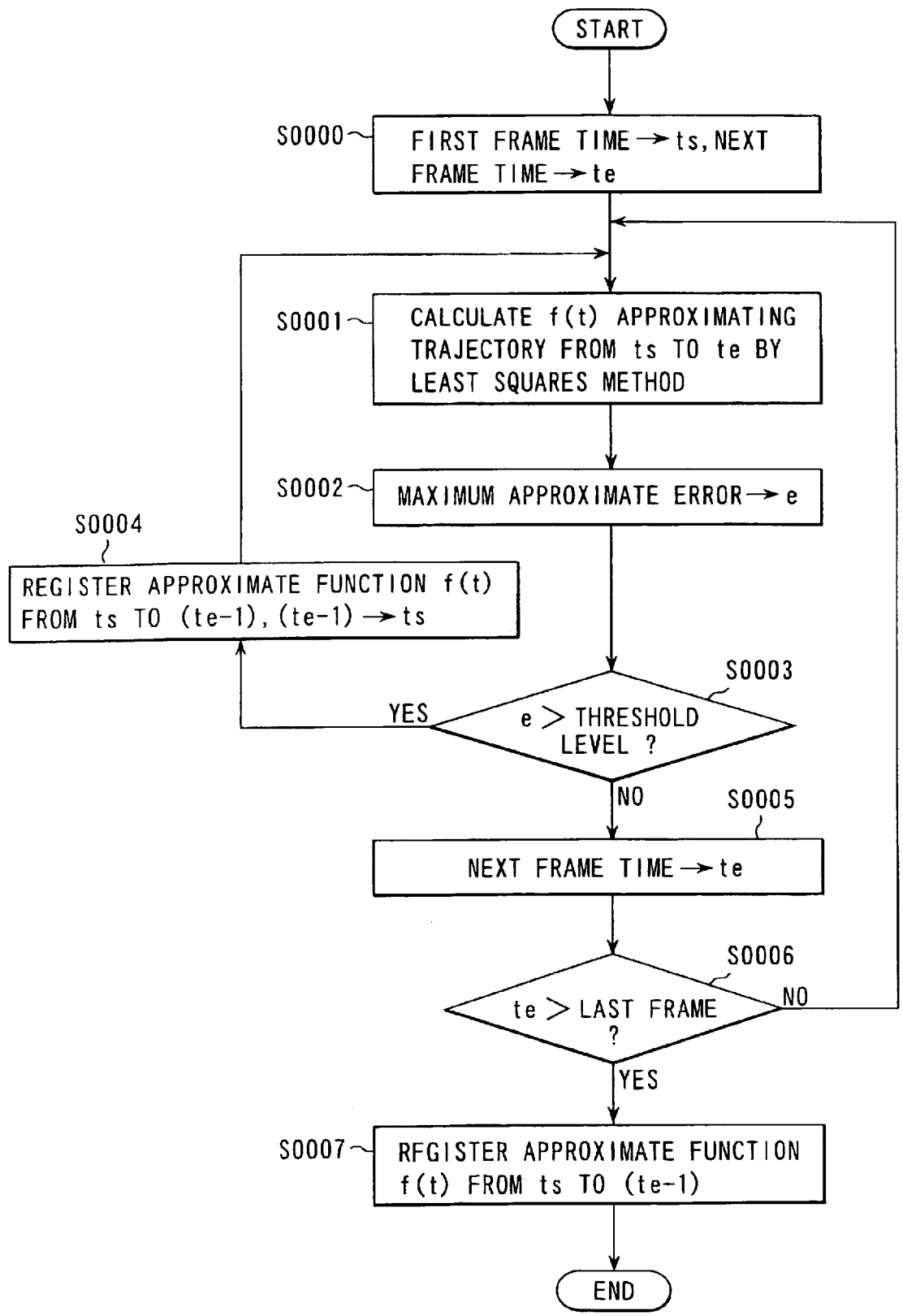
FIG. 30 is a flow chart showing a specific example of function approximation of the representative points trajectory.

In order to describe the object region in the data format shown in FIG. 27, it is necessary to approximate the parameter value by a function by the processes of the function approximation section 8 or steps S103, S204 or S305. A specific example of these processes will be explained with reference to the example of FIG. 30.

Step S0000 is an initializing process, in which initial values are substituted for a time stamp ts of a start frame and a time stamp te of a final frame of a frame range of interest. Here, a time of the first frame is set to ts and a time of the second frame is set to te. Step S0001 is a process for calculating an approximation function fi(t) (linear or secondary polynomial in this example) by reading out the parameter values $a_i$ from the parameter data arrangement (0000 in FIG. 29) and using a least squares method. Here, i=0, 1. In Step S0002, an absolute value difference between the parameter value calculated by the function fi(t) which has been calculated in step S0001 and the actual parameter value is obtained for each time in the interval from ts to te, and its maximum value is set to a variable "e". the maximum value "e" is an error area of the object region. The error is obtained from a difference between the actual area of the object region and an area of the region obtained by converting the reference object region using the conversion parameter. It is possible to use a ratio of the difference area to the object region area instead of the difference area. In the selecting process of step S0003, the value of "e" and a threshold which has been determined in advance are compared with each other. When the value of "e" is larger than the threshold, the process in step S0004 is performed, otherwise the process in step S0005 is performed.

In step S0004, the approximation function which has been calculated for the interval from the frame of the time ts to the frame just before the frame of the time te by method of least squares is registered, and the time stamp applied to the frame just before the frame of the time te is set to ts. By this step S0004, for example, the function $a_0=2.1\ t^2-12.6\ t\ (0\leq t\leq 2)$ of description 0001 in FIG. 29 is registered. $0\leq t\leq 2$ is an effective time interval of the function, and an interval from ts to te when the approximation function has been calculated corresponds to this time interval. This time interval is registered together with the function.

Step S0005 is a updating process for te, in which the value of te is updated to the time stamp applied to the frame next to the frame of the time te. Step S0006 is a termination determining process, where it is determined whether or not the time te exceeds the range to be processed, and when the time te does not exceed the range, the processes from step S0001 are repeated, otherwise the process proceeds to a final process in step S0007. Step S0007 is a process for registering a final approximation function. For example, the final function $a_0=0.2\ t^2-4.4\ t+12.4\ (10.5\leq t\leq 15)$ of description 0001 in FIG. 29 is the function which has been registered in this step.

When the calculation of the approximation functions is completed according to the above processes, data of these approximation functions is recorded according to a predetermined describing format. Example 0003 in FIG. 29 uses a describing format shown in FIG. 27 (portions of the knot time arrangement 1404, the arrangement 1406 of the parameter 1, the arrangement of the parameter 2, . . . , the linear function flag 1 (1407), the arrangement 1411 of the function specifying information 1, an the linear function flag 2 (1407)). For example, in the first function $a_0=2.1\ t^2-12.6\ t$ $(0\leq t\leq 2)$ of description 0001, 0.0 and 2.0 are recorded as knot times on both ends thereof. Also, 0.0 and −16.8 which are parameter values $a_0$ at these times are recorded. Furthermore, 2 is recorded as the function ID representing that the function is a secondary polynomial, and 4.2 is recorded as the function parameter for specifying the coefficient 2.1 of $t^2$, respectively. The relationship between the function parameter and the coefficient of $t^2$ is the same as shown in FIG. 28. In this describing format, for the linear polynomial, only the parameter values on both ends of the effective time interval of the polynomial are recorded, and, for the secondary polynomial, a value two times the secondary coefficient is also recorded together with the values on the both ends.

In description 0003, when 4 bytes for the real number, 1 bit for the linear function flag, and 2 bits for the function ID are spent, an amount of data required is only 57 bytes. This value is remarkably smaller than an amount of data of 1208 bytes required for description 0000 which has been calculated previously.

According to the present invention, the reason why such a reduction in an amount of data is made possible is because a property where movement of an object in the natural world is ordinarily smooth is utilized. That is, a data arrangement of parameter (conversion parameter) value representing deformation/movement of the object region can be expressed collectively by a polynomial when slight errors are allowed, and the memory capacity can be saved considerably by recording only the parameters specifying this polynomial, as compared with a case where all the parameter values are recorded.

Incidentally, the conversion model ID 1400, the origin coordinates 1412, the reference object region information 1401, the number of knots 1402 and the like shown in FIG. 27 are required as the whole of the object region data in addition to the items described in description 0003 in FIG. 29.

Next, variations relating to the data structure of object region data will be described hereinafter.

In the above-described examples, conversion parameters are obtained for all frames with respect to a certain object region. Frames for which conversion parameters are obtained may be sampled. For example, one frame out of three frames may be sampled and a reference object region in frame 1 as well as reference object regions in frames, 4, 7, . . . may be used.

If conversion parameters are expressed by a time function and information for specifying the function are described in object region data, then the object region data may be approximated by a function by the sampled parameter values as in the case of the above-described examples. In addition, it is not necessary to include information on sampling in the object region data.

Meanwhile, if conversion parameter values are directly described in the object region data, then (1) parameter values in the frames which are not sampled are appropriately interpolated (e.g., the same values as those in the frame which has been sampled just before the frame which is not sampled are described in the object region data) and the same object region data as that in FIG. 5 is prepared, or (2) sampling information 520 as shown in FIG. 31 is added to the object region data, only the parameter values in the sampled frames and information for allowing specifying a sampling method (e.g., numeric value n as information indicating that n frames are sampled once (note, however, that in case of n=1, for example, it is assumed that all frames are sampled)) may be described in the sampling information 520 in the first embodiment. In the method of (2), if using the object region data, parameter values in the frames which have not been sampled can be interpolated, if necessary, by referring to the sampling information 520. This is true for the embodiments other than the first embodiment.

Next, with the above constitution, it is also possible to fix the reference object region without executing a processing for determining whether the reference object region is to be updated. Since the processing can be made simpler, to fix the reference object region is effective when, for example, the movement of an object region is little or an error may be negligible to some extent. In that case, the same data structure of the object region data as that used above can be used (since the number of intervals in which the reference object region is fixed is 1 and the number of object region data is 1). Further, if the processing for determining whether or not the reference object information needs to be updated is not constantly carried out, a field on the number of intervals in which the reference object region is fixed may be removed from the data structure of the object region data and only one field on the object region description information may be provided.

Fifth Embodiment

Next, the concrete example of a reference object region selection method in the preceding embodiments will be described.

Figure 32:
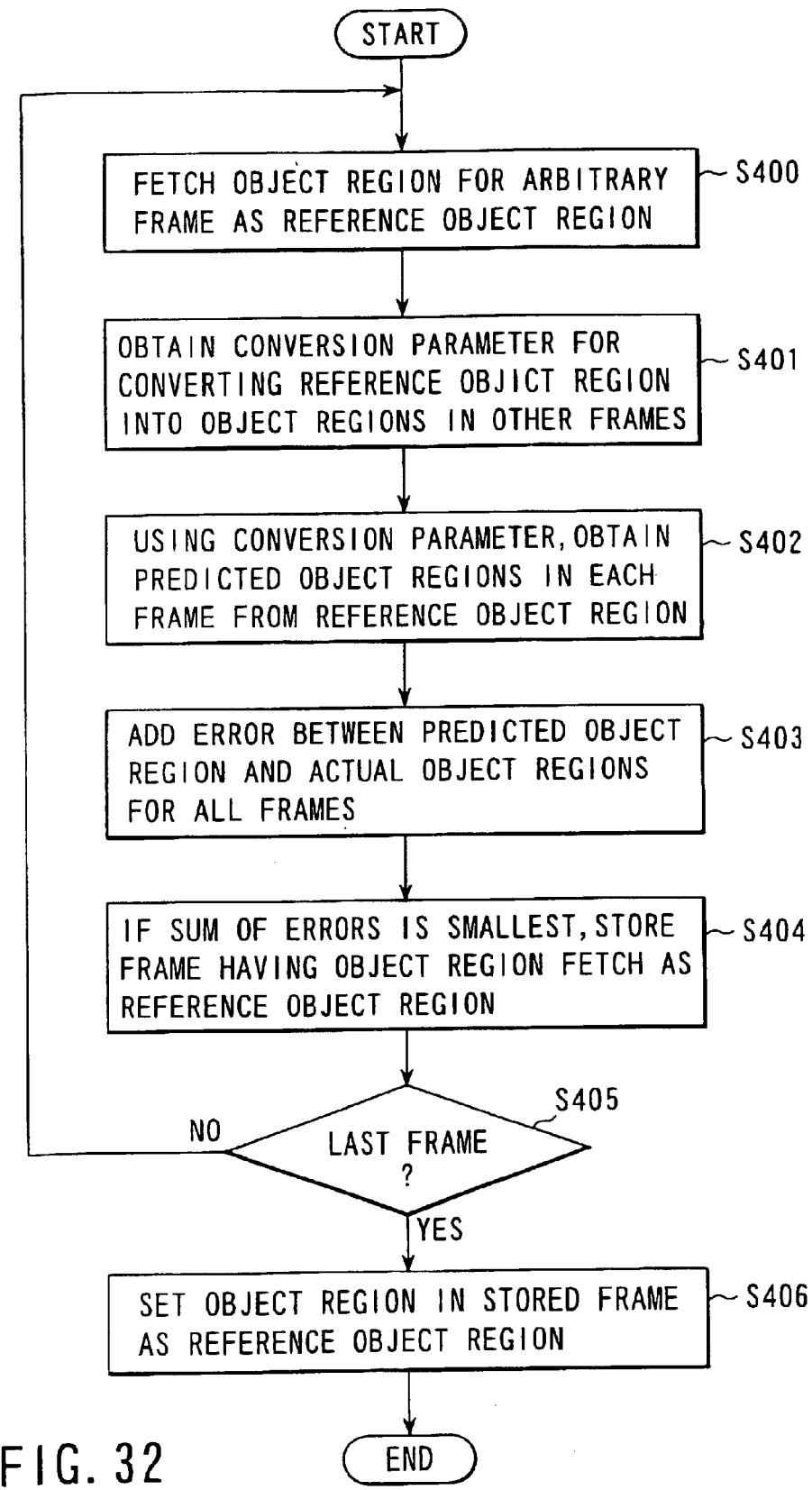
FIG. 32 is a flow chart showing one example of processing procedure for selecting a reference object region so as to minimize an error in a fifth embodiment.

FIG. 32 is a flow chart showing one example of a technique for selecting a reference object region from an object region existing time-interval so that the error of a predicted object region and the actual object region is minimized.

In step S400, object region data for an arbitrary frame is fetched from the object region existing time-interval as a reference object region.

In step S401, conversion parameters for converting the reference object region fetched in step S400 into object regions in other frames in the object region existing time-interval are calculated.

In step S402, using the reference object region fetched in step S400 and the conversion parameters calculated in step S403, predicted object regions in all frames but the reference frame in the object region existing time-interval are calculated.

In step S403, the errors between the predicted object regions and the actual object regions obtained in step S402 are calculated for all frames but the reference frame in the object region existing time-interval, respectively, and the errors thus obtained are added together to obtain a sum of errors.

In step S404, if the sum of errors obtained in step S403 is smaller than any other sum of the errors obtained before with the other frames used as reference frames, the current reference frame number is stored.

In step S405, a branch processing is carried out. Namely, if the current reference frame is the final frame in the object region existing time-interval, step S406 follows. Otherwise, step 400 follows. If the processing is branched to step S400, a new frame is set as a reference frame and the same processings are repeated.

In step S406, the reference frame number with which the sum of errors between the predicted object region and the actual object region stored in step S404 becomes a minimum, is fetched and the object region in this frame is set as a reference object region.

The embodiment shown in FIG. 32 has a large quantity of calculation. For that reason, if faster processings are desired, a specific frame may be selected as a reference frame at the expense of accuracy. This specific frame may be the first frame in the object region existing time-interval. However, if a central frame is used as a reference frame, the sum of the errors become a minimum at the longest distance among those between the reference frame and target frames, so that accurate approximation can be, in most cases, expected.

Figure 33:
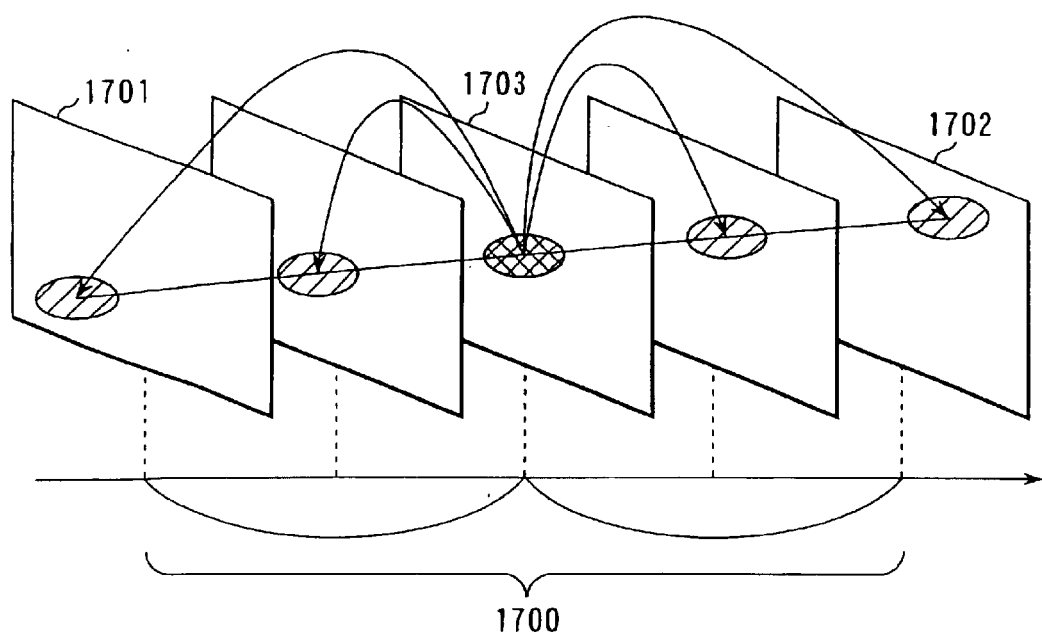
FIG. 33 is an explanatory view for one example of processing procedure while a central frame in the object region existing time-interval is set as a reference object region.

FIG. 33 is an explanatory view for one example of a technique for selecting a reference object region with the central frame in the object region existing time-interval used as a reference frame.

A central frame 1703 in the middle of the first frame 1701 and the final frame 1702 in the object region existing time-interval is selected as a reference frame, and conversion parameters for object regions in other frames are obtained.

Figure 35:
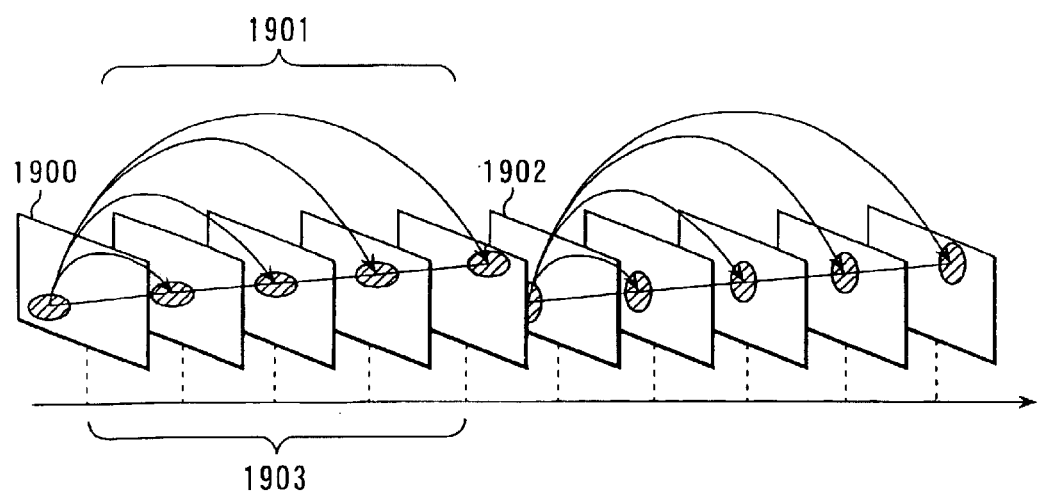
FIG. 35 is an explanatory view for one example of processing procedure while the first frame in the reference object region interval is set as a reference object region.
Figure 34:
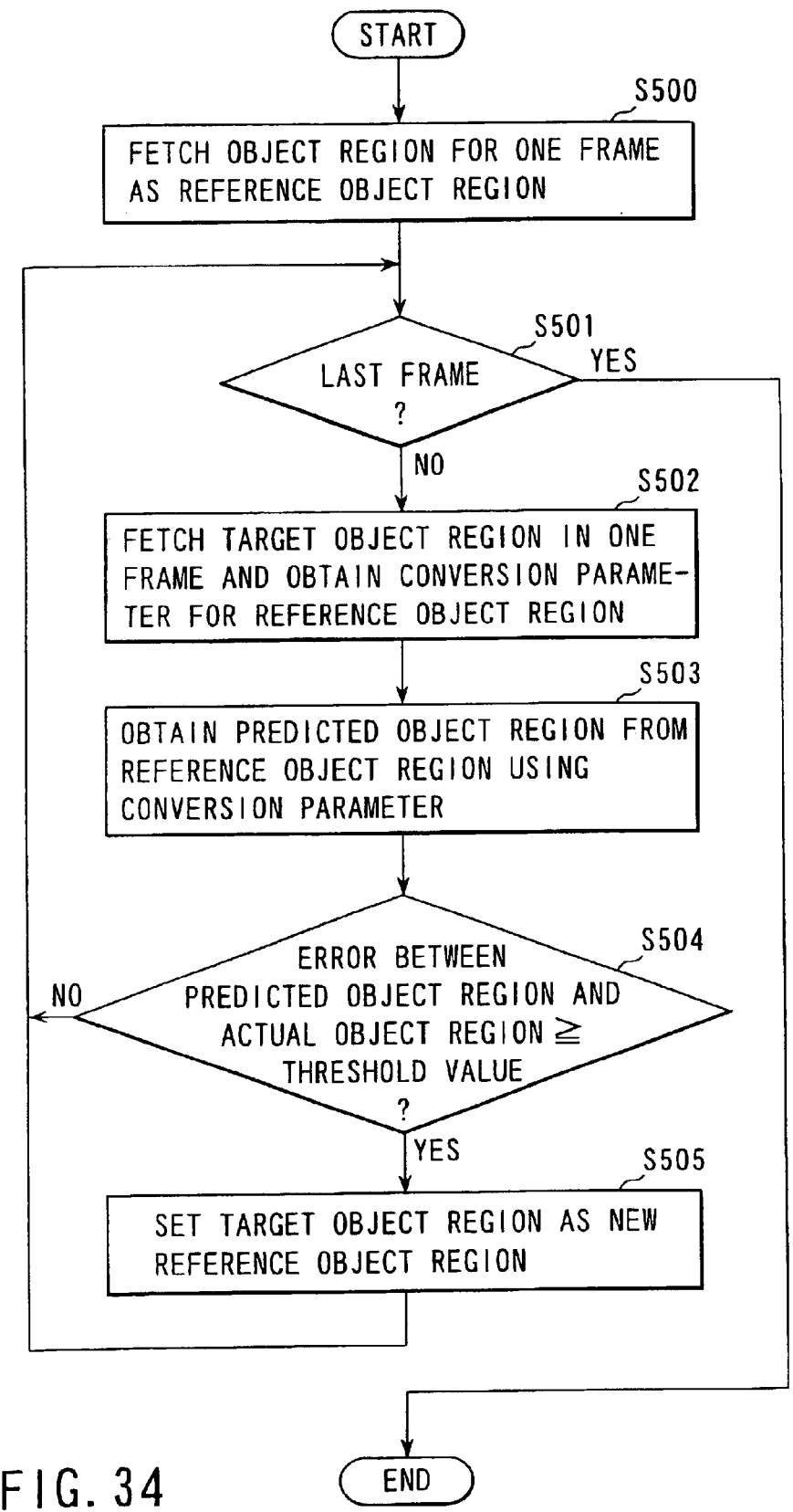
FIG. 34 is a flow chart showing one example of processing procedure while the first frame in the reference object region interval is set as a reference object region.

FIG. 34 is a flow chart showing one example of a technique for selecting a plurality of reference frames in a real-time manner from the object region existing time-interval. FIG. 35 is an explanatory view for this technique. If a real-time processing is executed, it is required to determine reference frames even if a final object region existing time-interval is not fixed.

In step S500, object region data for one frame is fetched as a reference object region from the object region existing time-interval. In FIG. 35, the object region data in the first frame 1900 is fetched.

In step S501, a branch processing is executed. Namely, if the current processing frame is the final frame in the object region existing time-interval, the processing is ended. Otherwise, step S502 follows.

In step S502, object region data in the next frame to the frame for which the object region is fetched in step S500, is fetched as a target object region from the object region existing time-interval, and conversion parameters with reference to the reference object region determined in step S501 are calculated.

In step S503, a predicted object region is obtained using the reference object region determined in step S501 and the conversion parameters calculated in step S502.

In step S504, a branch processing is executed. Namely, it is determined whether the error between the predicted object region obtained in step S503 and the actual target object region in step S502 exceeds a threshold value. If the error exceeds the threshold value, step S505 follows. Otherwise, step S501 follows.

If the processing is branched to step S501 and the current frame is not the final frame in the object region existing time-interval, the same processings as those stated above are repeated. A group of the frames repeatedly processed corresponds to a time-interval denoted by reference symbol 1901 shown in FIG. 35 with respect to the same reference frame.

In step S505, the current frame is set as a new reference frame, and step S501 follows. In step S501, the same processings are repeated if the current frame is not the final frame in the object region existing time-interval. In FIG. 35, the new reference frame is the frame denoted by reference symbol 1902.

If the reference frame is updated, a constant reference object region time-interval 1903 is determined. The object region existing time-interval is constituted by a plurality of constant reference object region time-intervals.

Figure 36:
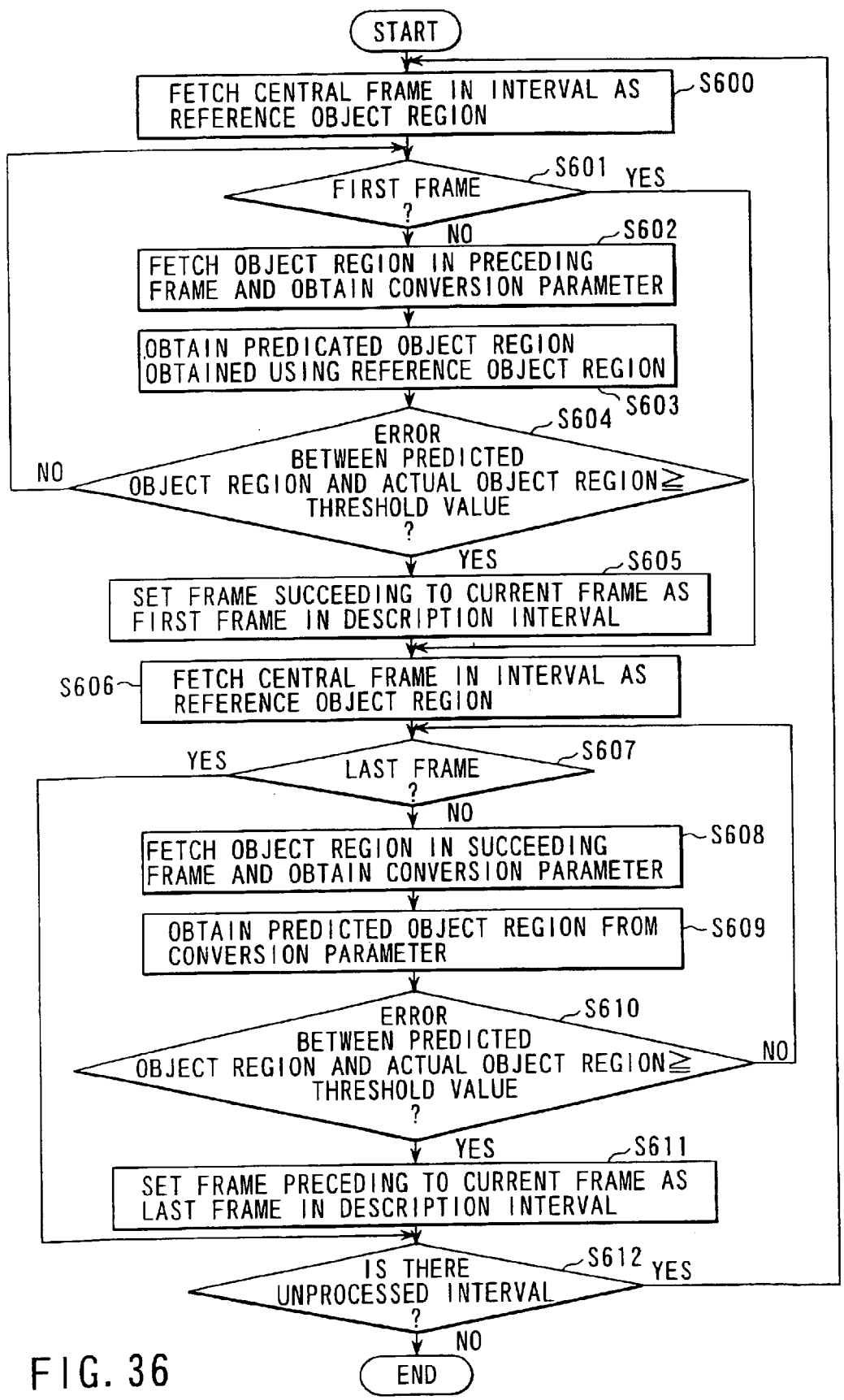
FIG. 36 is a flow chart showing one example of processing procedure while a central frame in the reference object region interval is set as a reference object region.
Figure 37:
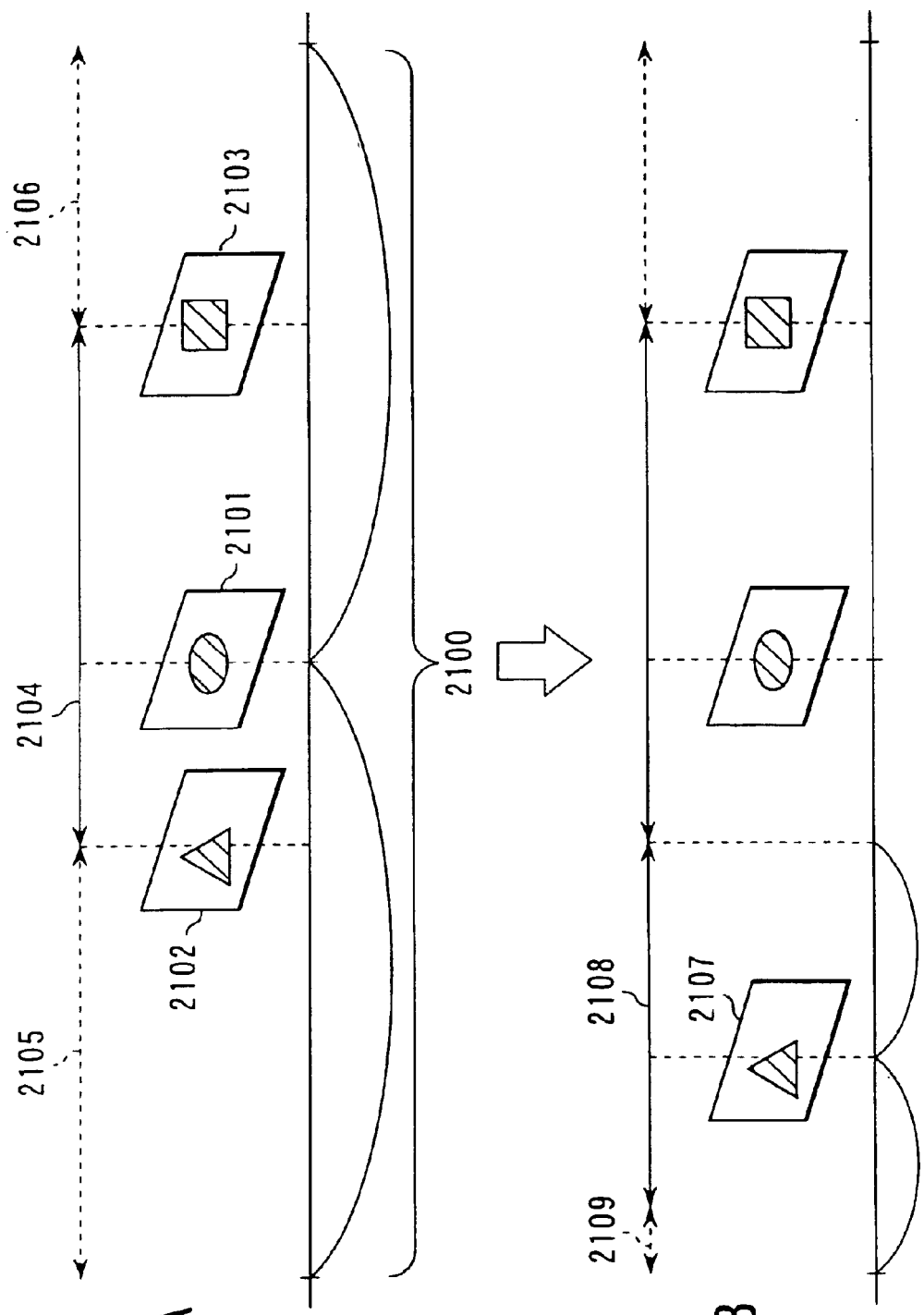
FIGS. 37A and 37B are explanatory views for one example of processing procedure while a central frame in the reference object region interval is set as a reference object region.

FIG. 36 is a flow chart showing another technique for selecting a plurality of reference frames from an object region existing time-interval. FIGS. 37A and 37B are explanatory views for this technique.

In step S600, object region data on a central frame is fetched as a reference object region from an unprocessed object region existing time-interval. In FIG. 37A, the central frame 2101 in the object region existing time-interval 2100 is used as a reference frame.

In step S601, a branch processing is executed. Namely, it is determined whether or not a currently processed frame is the first frame in the unprocessed object region existing time-interval. If the frame is not the first frame, step S602 follows. If the frame is the first frame, step S606 follows.

In step S602, an object region in one frame before the currently processed frame is fetched and conversion parameters for the reference object region in step S600 are calculated.

In step S603, a predicated object region is calculated using the reference object region obtained in step S600 and the conversion parameters calculated in step S602.

In step S604, a branch processing is executed. Namely, it is determined whether or not the error between the predicted object region calculated in step 5603 and the actual target object region calculated in step S602 exceeds a threshold value. If the error exceeds the threshold value, step S601 follows. If the processing is branched to step S601 and the current frame is not the first frame in the unprocessed object region existing time-interval, then the same processings as those stated above are repeated.

In step S605, a frame succeeding to the current frame is set as the first frame in the constant reference object region time-interval. In FIGS. 37A and 37B, if the error exceeds the threshold value for the object region in the frame 2102 (k-th frame) while the object region in the reference frame 2101 is set as a reference object region, then the (k+1)th frame becomes the first frame in the constant reference object region time-interval.

In step S606, object region data on a central frame is fetched as a reference object region from an unprocessed object region existing time-interval.

In steps S607 to S611, the same processings as those in steps S601 to S605 stated above are executed to succeeding frames. In FIGS. 37A and 37B, if the frame just before a frame 2103 becomes the final frame in the constant reference object region time-interval, unprocessed object region existing time-intervals 2105 and 2106 remain.

In step S612, a branch processing is executed. Namely, if there exists an unprocessed object region existing time-interval, step S600 follows. If not, the processing is ended. If the processing is branched to step S600, a central frame in the unprocessed object region existing time-interval is used as a new reference frame and processings are repeated until the unprocessed object region existing time-interval no longer exists. FIG. 37B shows an example in which a central frame 2107 in an unprocessed object region existing time-interval 2105 is processed as a new reference frame and a new constant reference object region time-interval 2108 and an unprocessed object region existing time-interval 2109 are generated.

Sixth Embodiment

Next, description will be given to a method of generating object region data by dividing one object into a plurality of regions in the above described embodiments.

Conventionally, one conversion parameter is obtained for one object. In case of an object which apparent shape has great change, however, it is sometimes preferable to divide an object into a plurality of regions and use conversion parameters for the respective regions. For example, a walking person heavily moves his or her hands and legs although less moves his or hear head and body. In that case, it is possible to obtain conversion parameters for the respective parts in a stable manner by dividing the object into separate regions of head/body/hands/legs rather than dealing with the person as one object.

If one object is expressed by a plurality of figures, it is required to execute a processing for dividing the object into a plurality of regions. This processing may be executed by any method such as a processing method of directly inputting figures manually. In that case, this processing can be realized by operations including using a pointing device such as a mouse, and allowing regions to be surrounded by rectangles or ellipses on an image or designating regions by the trajectory of the pointing mouse. Further, if input operation is carried out not manually but automatically, there is proposed a method of realizing the processing by, for example, clustering the movement of an object. According to this method, the movements of the respective regions of the object between continuous frames are calculated by a correlation method (see, for example, Gazo Kaiseki Handbook (Image Analysis Handbook), Section II, Chapter 3, Tokyo University Publication, 1991) or a gradient method (see, for example, B. K. P. Horn and B. G. Schunck, "Determining optical flow", Artificial Intelligence, vol. 17, pp. 185–203, 1981), and only the similar movements among them are gathered to thereby form regions.

Figure 38:
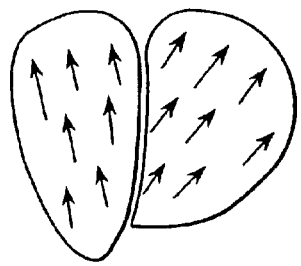
FIG. 38 is an explanatory view for a state in which one object is divided into regions having similar movement by an optical flow in a sixth embodiment.

FIG. 38 shows a state in which regions having a similar optical flow are gathered together and an object is thereby divided into a plurality of regions.

Figure 39:
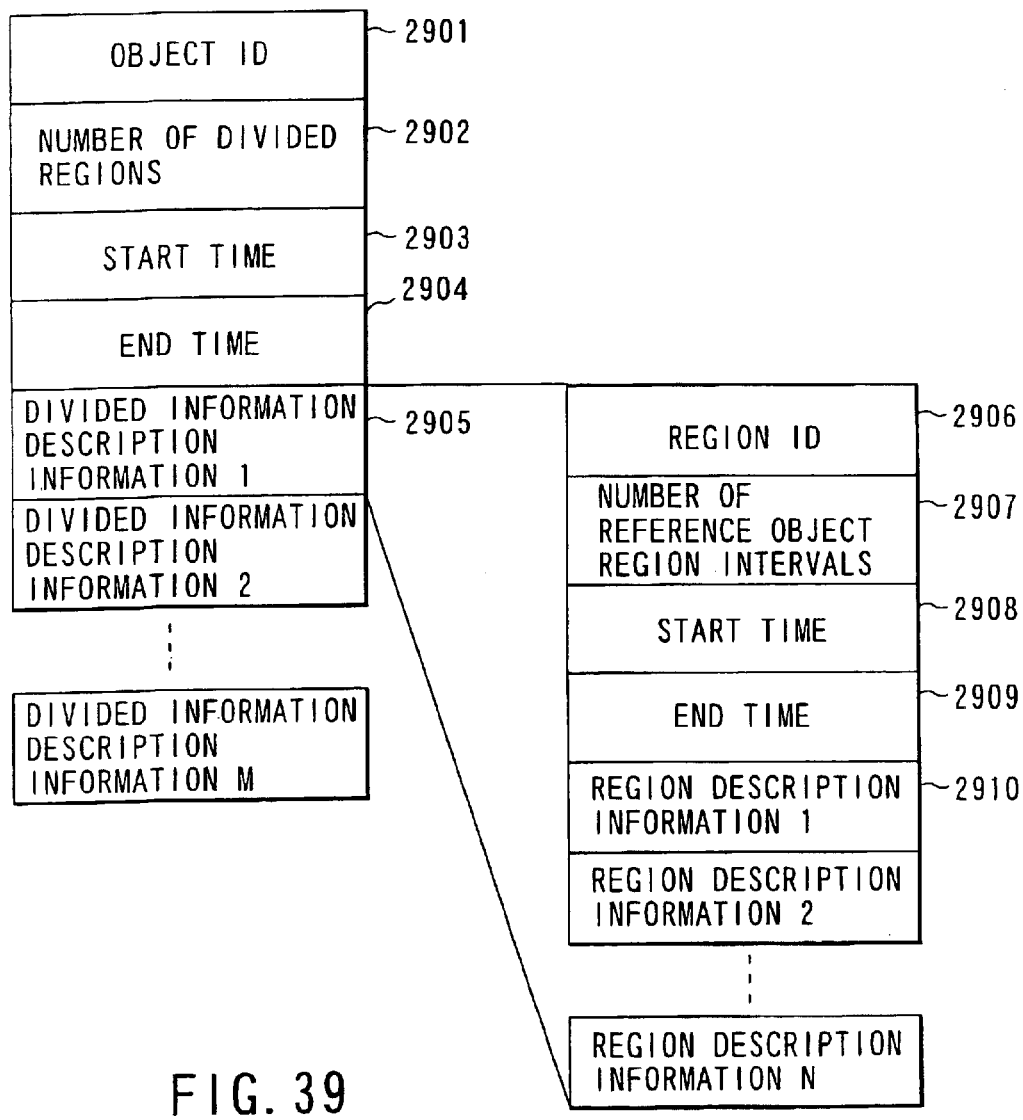
FIG. 39 shows one example of an object region data description format for describing one object in a plurality of regions.

FIG. 39 shows one example of data structure for describing an object in a plurality of regions. The example of FIG. 39 is to expand the data structure (FIG. 18) for describing the object in a single region and data following region ID data 2906 are the same as those in FIG. 18. The number of divided regions is stored in 2902 and data on the respective divided regions are held in 2905 and the following. Further, even a region having a vacant space as shown in FIG. 15 can be handled by the data structure shown in FIG. 39 by expressing the region while the vacant space regarded as one region.

Seventh Embodiment

Next, description will be given to an example of use of the object region data calculated in the above described embodiments.

For example, related information on the object may be added to the object region data. In that case, a hypermedia application allowing the related information on the object to be presented can be realized by indicating (e.g., by clicking of a mouse) an object in a video by a user looking at the video.

Here, a video and an object may be freely chosen. For example, if a video is the contents of a movie or the like, an object is a character such as an actor (actress) or another character object, and related information is explanations about the actor (actress) or his (her) character or the like, then audience who see the movie can read the explanation about a desired actor (actress) simply by clicking the image of the actor (actress). Likewise, this method is applicable to every electronic contents such as an electronic cyclopedia and an electronic catalog.

The related information may be characters, voice, a still image, a moving image, an appropriate combination thereof, or data in which the operation of a program or a computer is described. In the former case, information is presented. In the latter case, the program or the like is executed.

A pointer information such as an address for acquiring the related information may be added to the object region data instead of the related information itself.

Additionally, if a keyword is described in the related information, the object can be searched and retrieved based on the keyword. Besides, if characteristic quantities, such as shape, texture, activity and color, extracted from the object are described in the related information, the object can be searched and retrieved based on those characteristic quantities.

Furthermore, it is possible to realize a supervising system, for example, for supervising a questionable person or the like based on characteristic quantities, such as the shape, texture, activity and color of the object, obtained by analyzing the object region data.

A method of providing video data and/or object region data will be described hereinafter.

If the object region data generated by the processings described in the embodiments of the present invention are provided to a user, the creator of the object region data needs to provide it to the user in some way or another. To do so, there may be various methods as follows:

(1) To record video data, object region data on the video data and related information on the object region data on a single (or plural) recording medium (or media) and to simultaneously provide the data and information.

(2) To record video data and object region data on the video data on a single (or plural) recording medium (or media) and to simultaneously provide the data, but to provide related information separately or provide no related information (in the latter case, even if the related information is not provided, the user can separately acquire the related information through the network or the like).

(3) To provide video data independently, to record object region data and related information on a single (or plural) recording medium (or media) separately from the video data and to simultaneously provide the data and information.

(4) To provide video data, object region data and related information independently of one another.

The above methods mainly concern providing the video data, object region data and related information by means of a recording medium (or media). Alternatively, part of or all of the video data, object region data and related information may be provided through a communication medium.

Eighth Embodiment

Now, description will be given to an example in which the object region expression method of the present invention is applied to a hypermedia.

In a hyperlink for linking an object to related information, it is necessary to detect that the object is specified by a user. In this embodiment, one example of a method of determining whether the point specified by the user is inside or outside an object region, will be described.

Description will be given in this embodiment, while taking, as an example, a case of presenting related information (displaying characters, a still image, a moving image or the like, outputting voice or the like) or of executing a related program by user's indicating the object (mainly on a GUI image screen).

Figure 40:
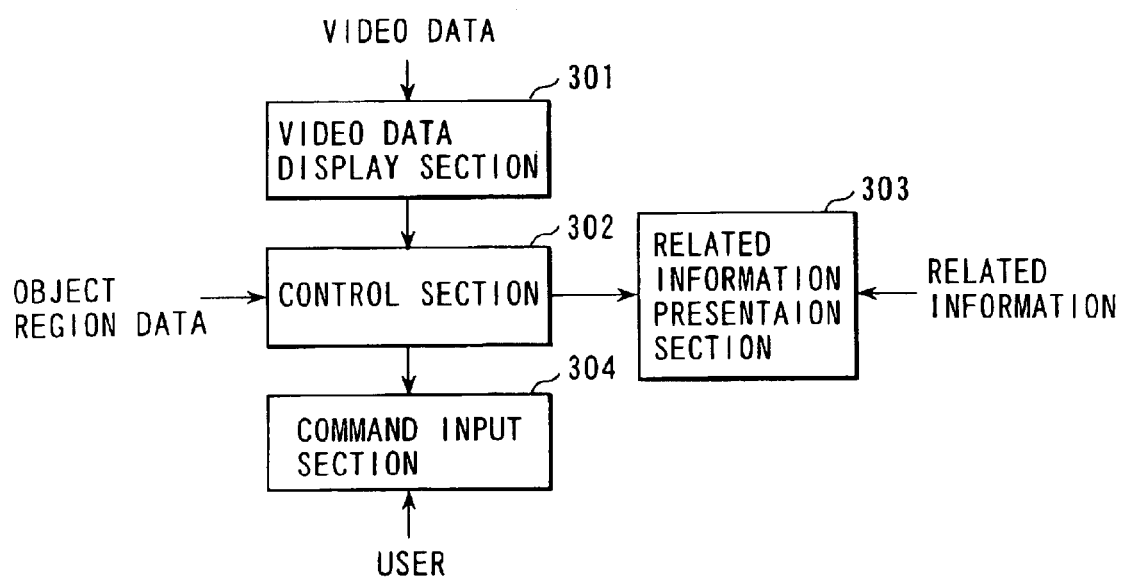
FIG. 40 shows an example of the constitution of a video processing apparatus in an eighth embodiment.

FIG. 40 shows an example of the constitution of a video processing apparatus according to this embodiment. As shown in FIG. 40, the video processing apparatus is comprised of a video data display section 301, a control section 302, a related information presentation section 303 and a command input section 304.

The video data display section 301 displays video data inputted from a recording medium or the like, which is not shown, on a liquid crystal display device, a CRT or the like.

The command input section 304 allows a user to execute an operation for indicating an object in a video displayed on the liquid display device, the CRT or the like by either a pointing device such as a mouse or a keyboard, and receives the user's input.

As will be described later in detail, the control section 302 determines whether or not the user indicates an object in the video based on, for example, the coordinates indicated on the image screen by the user and object region data inputted from the recording medium or the like which is not shown.

The related information presentation section 303 presents the related information when the control section 302 determines that the object has been indicated and the related information has been added to the object region data, and acquires and then presents the related information (from the recording medium, a server through the network or the like) based on pointer information on the related information when the pointer information is added to the object region data.

It is noted that if the related information is data on which the operation of a program or a computer is described, the program is executed.

Furthermore, if the object is indicated and actions other than the presentation of the related information or the like is taken, a corresponding processing section instead of the related information presentation section 303 is mounted on the information processor.

It goes without saying that this embodiment can be executed by a software.

Now, processing procedure in this embodiment will be described while referring to an example shown in FIG. 41.

Figure 41:
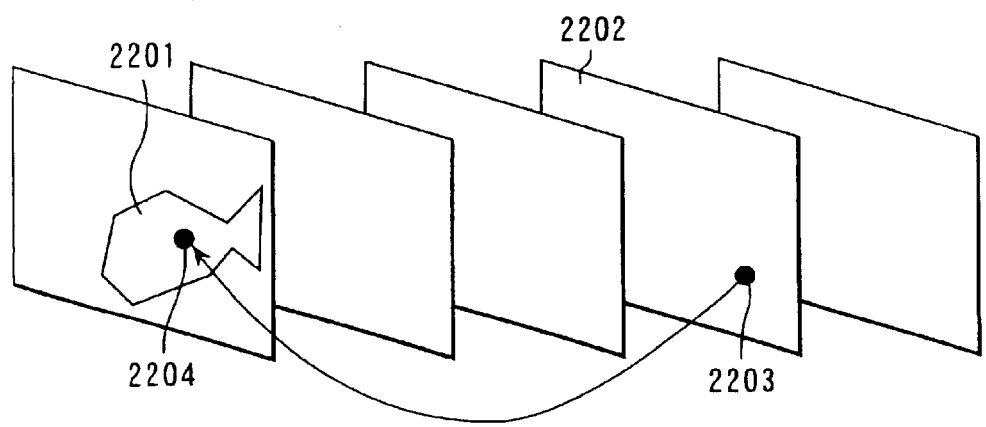
FIG. 41 is an explanatory view for a method of determining whether a specified point is inside or outside of the object region.

In FIG. 41, a reference object region is denoted by a reference symbol 2201 and a target frame is denoted by a reference symbol 2202. A point indicated by a user is denoted by a reference symbol 2203 and the corresponding position of the point 2203 in the reference frame is denoted by a reference symbol 2204.

Figure 42:
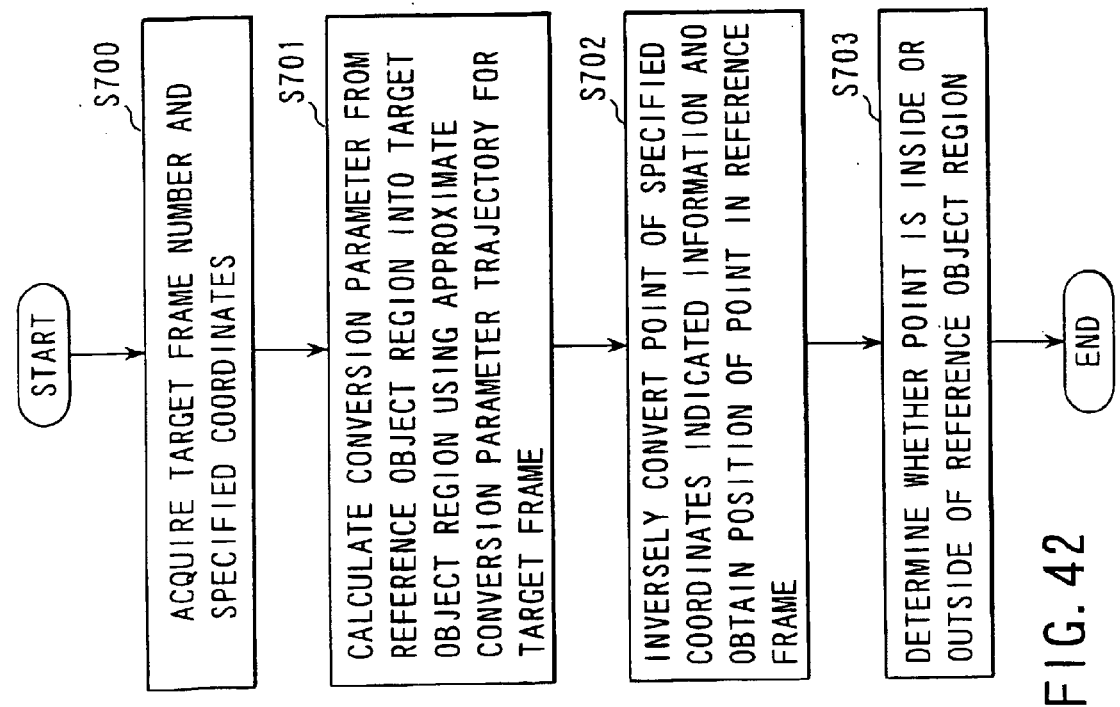
FIG. 42 is a flow chart showing one example of processing procedure for determining whether a specified point is inside or outside of the object region.

FIG. 42 shows one example of the processing procedure in this embodiment. It is noted that the flow chart of FIG. 42 only shows a processing for determining whether the point which has been indicated by the pointing device, such as a mouse cursor, in the displayed video during the reproduction of the video, is inside or outside an object region (which processing basically corresponds to that of the control section 302).

In step S700, a target frame number and the coordinates of the indicated point are acquired. Namely, a calculation is made to determine to which part of an image in the video the coordinates on the image screen indicated by means of the pointing device or the like corresponds. The frame number of the video which is being reproduced at the moment the point is indicated is also acquired. It is noted that not the frame number but a time stamp may be used (in the following description, it is assumed that the frame number is used).

It is now assumed that an object existing in the video in the target frame number is selected from the object region data on the object in the video which data is attached to the video. This selection can be easily executed by referring to the first frame number and a final frame number in the object region data.

When no object (which can be indicated) exists in the frame, the processing is ended here.

If a plurality of target objects exist, the following processing is executed for each object or sequentially executed until the indicated object is obtained repeatedly or simultaneously or the final object is obtained.

In step S701, a conversion parameter is calculated from an approximate conversion parameter trajectory for the target object. This conversion parameter indicates conversion from the reference object region into the target object region.

If the frame number is 10 in the example of FIG. 29 when the operator clicks the image, the time stamp is 1.0 (sec.) in the case of a moving image of 10 frames/sec. With respect to the knot time in 0003, it is found that the approximation function is a function between the first and second knots since the time stamp (=1.0) is between the first one (0.0) and the second one (2.0). From description 0003, it is found that the parameter values are 0.0 and −16.8 for both knots, respectively as well as the function ID is 1 and the function parameter is 4.2. Using these information and equation shown in FIG. 28, the approximation function $a_0=2.1\ t^2-12.6\ t$ of the parameter $a_0$ from time stamp 0.0 to time stamp 2.0 is calculated. The value $a_0=-10.5$ is calculated by substituting t=1.0 into the above function. Similarly, the parameter value $a_1=5.4$ is calculated by substituting t=1.0 into an approximation function $a_1=5.4\ t$.

In step S702, the indicated point is inversely converted and the position of the converted point in the reference frame is calculated.

In the above example, the parameter values (a0, a1)=(−10.5, 5.4) are calculated for the parallel translation model. If the user specifies the coordinates (50, 70), the result of inverse conversion of parallel translation is (60.5, 64.6)=(50, 70)−(−10.5, 5.4).

If the conversion is, for another example, Affine conversion, mathematical formula (8) may be employed to obtain the point 2204 from the point 2203 in FIG. 41.

$$\begin{bmatrix} x \\ y \\ 1 \end{bmatrix} = \begin{bmatrix} a & b & c \\ d & e & f \\ 0 & 0 & 1 \end{bmatrix}^{-1} \begin{bmatrix} x' \\ y' \\ 1 \end{bmatrix} \quad (8)$$

It is assumed that the coordinates of the point 2203 are (x', y') and those of the point 2204 are (x, y).

In step S703, it is determined whether the point is inside or outside of the reference object region.

A determination method depends on an available method of expressing the object region. Taking a case of bit map expression and polygon expression, as examples, the determination method will be described hereinafter.

Figure 43:
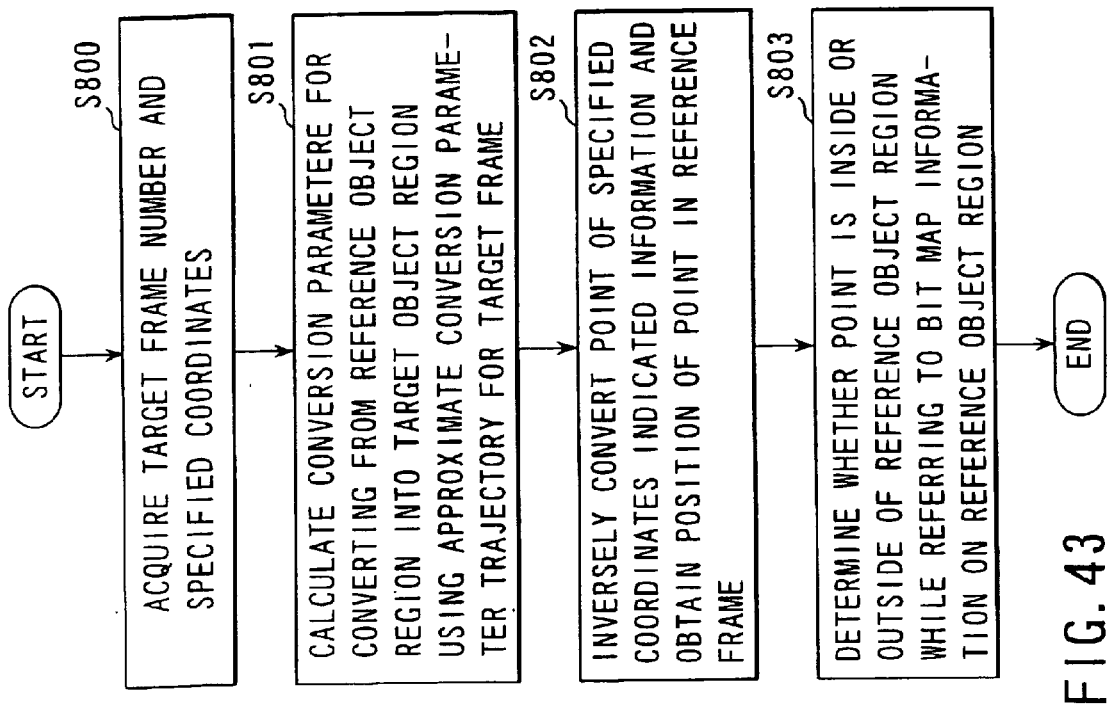
FIG. 43 is a flow chart showing one example of an inside/outside determination method when the reference object region is expressed by a bit map.

If the reference object region is expressed by a bit map, the determination is made according to procedure shown in FIG. 43. The expression of the reference object region by the bit map may include, for example, expressing the outside of the object region by "1" and the outside thereof by "0". While referring to bit map information on the position of the point calculated in step S802, it is determined that the point is inside the object region when the value is "1" and that the point is outside the object region when the value is "0" in step S803.

Figure 44:
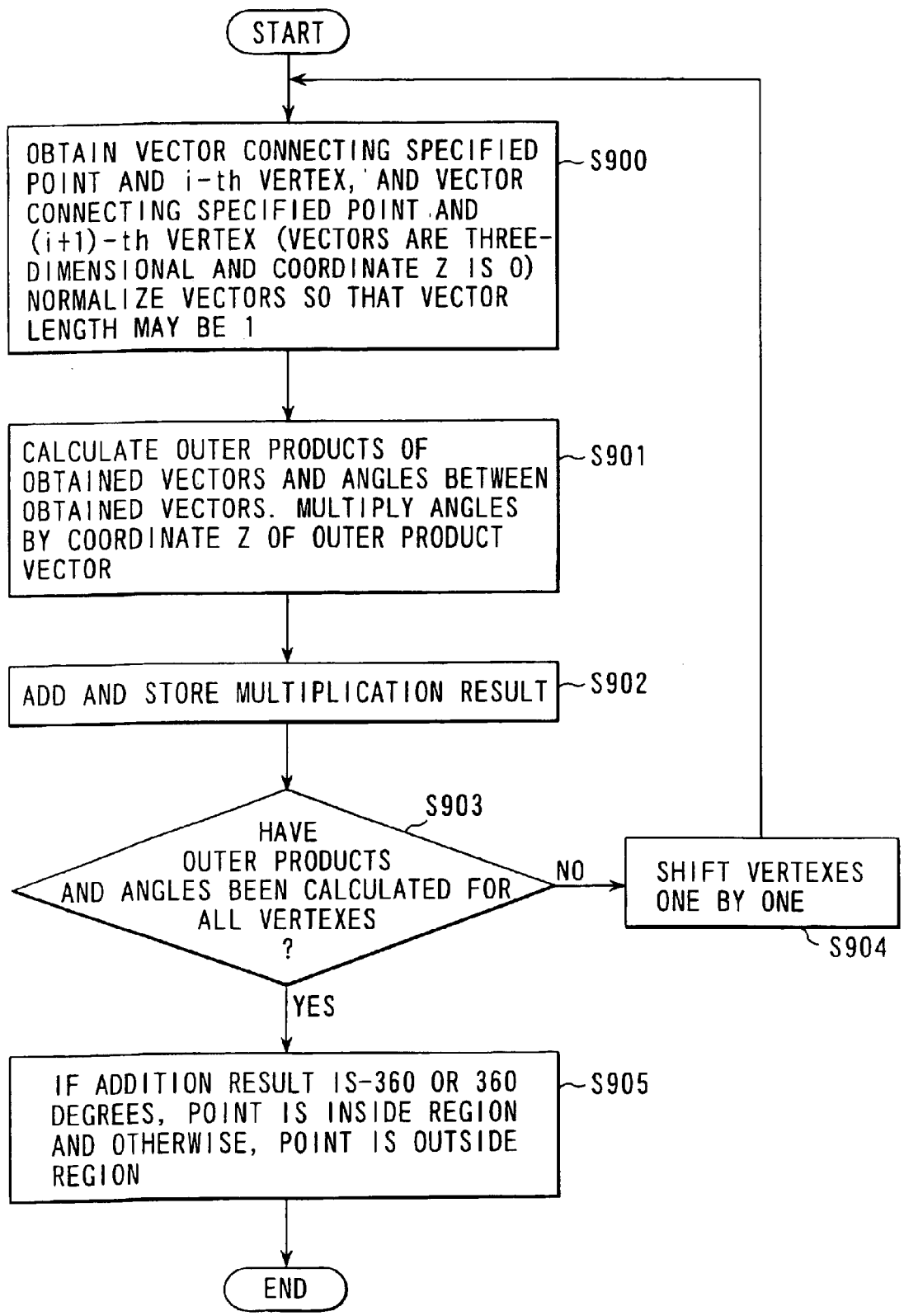
FIG. 44 is a flow chart showing one example of an inside/outside determination method when the reference object region is expressed by a polygon.
Figure 45:
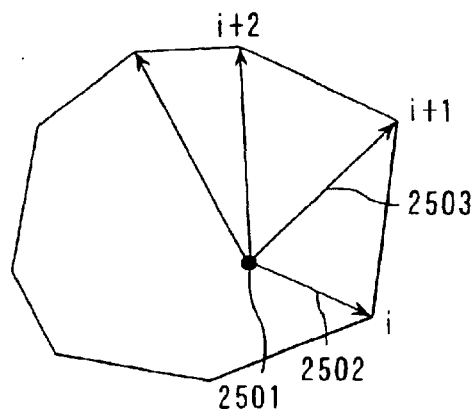
FIG. 45 is an explanatory view for an inside/outside determination method with respect to a polygon and a point.

Further, if the reference object region is expressed by a polygon, the determination is made according to procedure shown in FIG. 44. As for the polygon of the reference object region shown in FIG. 45, a point 2501 and vectors 2502 and 2503 coupling adjacent two vertexes of the polygon with the point 2501 are generated. The vectors are set to move three-dimensionally and a coordinate z is set at 0. Also, the vectors are normalized so that vector length may be 1. The outer products of the two vectors and angles between the two vectors are calculated for all the vertexes of the polygon while shifting the vertexes one by one. The outer product vector is perpendicular to the polygon and the coordinate z has a value from −1 to 1. The calculated angles are multiplied by the respective coordinate z of the outer product vector and added together. Then, if the point is inside the polygon, the angle is either −360 degrees or 360 degrees. If outside the polygon, the angle has a value other than −360 degrees and 360 degrees. In this way, the determination as to whether the point is inside or outside the reference object region can be made.

Moreover, if the reference object region is expressed by representative points which are ordered, the reference object region is expanded on a bit map first and then a determination can be made.

First, the representative points of the reference object region are coupled according to the order to thereby form a polygon. The determination method in a case the reference object region is expressed by a polygon is the same as the method already described above. To expand the polygon thus generated on the bit map, straight line formulas indicating all sides of the polygon are calculated. From these formulas, simultaneous inequalities expressing the inside of the polygon are generated.

Figure 46:
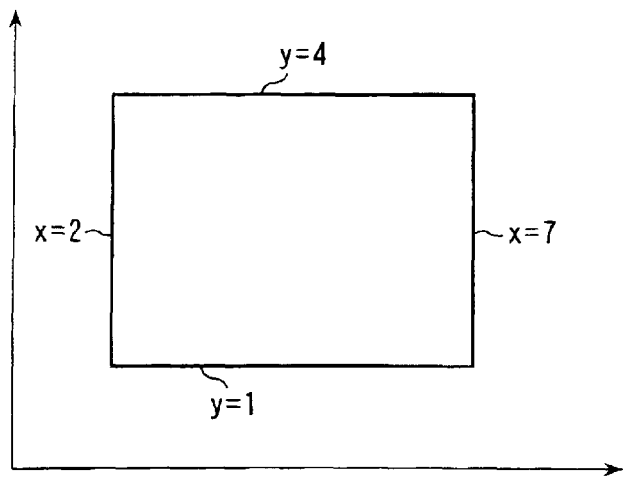
FIG. 46 is an explanatory view for a method of expanding the reference object region expressed by a polygon to bit map expression.

FIG. 46 shows, as a simple example, a case where the polygon is a rectangle. If the formulas for the respective sides of the rectangle have been calculated as shown in FIG. 46, simultaneous inequalities expressing the inside of the polygon are calculated as the following mathematical formula (9):

$$\begin{cases} x \geq 2 \\ x \leq 7 \\ y \geq 1 \\ y \leq 4 \end{cases} \quad (9)$$

If the coordinates of the respective pixels of the bit map satisfy these simultaneous inequalities, the pixel values are set at "1", and if not, the pixel values are set at "0", thereby making it possible to expand the representative points to the bit map. The determination method by the expanded bit map is the same as the method already described above.

As a result of the above-described determination, if it is detected that a certain object region has been indicated, a predetermined processings are executed accordingly.

For example, while referring to the pointer to the related information included in the object region data, the related information is acquired based on the pointer information and displayed or the like (in the example of FIG. 40, the processing is executed by the related information presentation section 303). If a program is specified as related information, the specified program is executed and other predetermined specified operations are executed. It is noted that if the related information itself is described on the object region data, the information may be displayed or the like.

Figure 47:
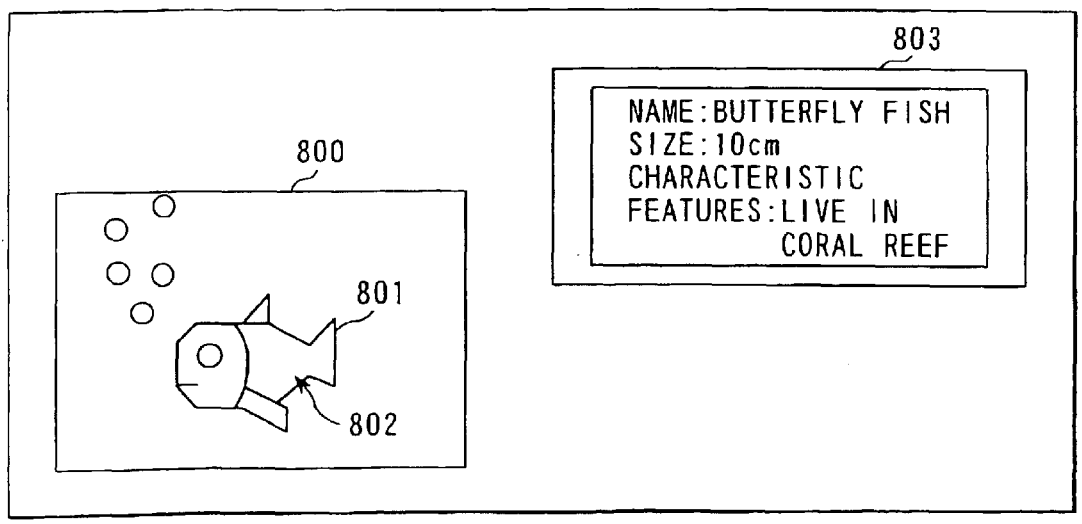
FIG. 47 shows an example of displaying hypermedia contents utilizing object region data.

FIG. 47 shows one example in which the explanation of an object in a video is added as related information. If the coordinates indicated by a pointing device 802 while a video 800 is being reproduced is inside the region of (an approximate figure of) an object 801, related information 803 is displayed.

The above-described respective functions can be executed by software, as well.

This embodiment can be also carried out as a computer readable recording medium which records a program for allowing a computer to execute predetermined means (or for allowing the computer to function as predetermined means or to realize predetermined functions).

Additional advantages and modifications will readily occur to those skilled in the art. Therefore, the present invention in its broader aspects is not limited to the specific details, representative devices, and illustrated examples shown and described herein. Accordingly, various modifications may be made without departing from the spirit or scope of the general inventive concept as defined by the appended claims and their equivalents. For example, while the respective embodiments have been described independently of one another, a plurality of embodiments may be appropriately combined.

According to the present invention, the target object region in the video is described based on the reference object region and conversion parameter, whereby a desired object region in the video can be described with a small quantity of data and the data can be easily handled.

Further, according to the present invention, the determination as to whether an object in the video has been indicated by a user can be easily made.

What is claimed is:

1. A data signal for use in a video decoding apparatus for describing information of an object region in a video sequence, comprising:
    time data including a start time and a duration time of the object region in the video sequence;
    reference object region information specifying coordinates of vertices of representative points of a figure, the figure representing a reference object region in a shape of polygon;
    type data specifying a parametric model specifying a conversion from the reference object region to an object region of an arbitrary image in the video sequence, the parametric model being described by a motion parameter;
    parameter information specifying a trajectory of a change of the motion parameter, the parameter information comprising;
        time arrangement data including times of points used to determine the trajectory;
        a key value data representing values of the points used to determine the trajectory;
        a function data indicating the trajectory of the motion parameter using information indicating an order of a function used to determine the trajectory or that no function is defined.

2. A data signal of claim 1, wherein:
    the function data is used to indicate the trajectory using a formula:

$$f(t)=fa+va(t-ta),$$

where va=(fb−fa)/(tb−ta), when an order of a function used to indicate the trajectory is first order, where ta represents a time of a first point of the points used to determine the trajectory, tb represents a time of a second point of the points used to determine the trajectory, fa is a coordinate of the first point, fb is a coordinate of the second point, and t is a time of a point to be determined.

3. A data signal of claim 2, wherein the parametric model includes at least one of an enlargement and reduction model, a rotation model, a parallel translation model, a 4-parameter model, an affine model, a projection model, and a parabolic model.

4. A data signal of claim 2, wherein the time arrangement data is sorted in increasing order.

5. A data signal of claim 2, wherein the data signal comprises hypermedia information.

6. A data signal of claim 2, wherein the object region in the video sequence appears in a first frame including the reference object region and second and third frames included in the same video sequence, and the function data indicates a positional relationship between the first frame and the second frame and a positional relationship between the first frame and the third frame.

7. A data signal of claim 1, wherein the function data further comprises:
    parameter data specifying a second order coefficient for the trajectory when an order of a function indicating the trajectory is second order.

8. A data signal of claim 7, wherein the function data is used to indicate the trajectory using a formula:

$$f(t)=fa+va(t-ta)+\tfrac{1}{2}aa(t-ta)^2,$$

where va=(fb−fa)/(tb−ta)−½aa (tb−ta) when an order of a function used to indicate the trajectory is second order, where ta represents a time of a first point, tb represents a time of a second point, fa is a coordinate of the first point, fb is a coordinate of the second point, and t is a time of a point to be determined.

9. A data signal of claim 8, wherein the parametric model includes at least one of an enlargement and reduction model, a rotation model, a parallel translation model, a 4-parameter model, an affine model, a projection model, and a parabolic model.

10. A data signal of claim 8, wherein the time arrangement data is sorted in increasing order.

11. A data signal of claim 8, wherein the data signal comprises hypermedia information.

12. A data signal of claim 8, wherein the object region in the video sequence appears in a first frame including the reference object region and second and third frames included in the same video sequence, and the function data indicates a positional relationship between the first frame and the second frame and a positional relationship between the first frame and the third frame.

13. A data signal for use in a video decoding apparatus for describing information of an object region in a video sequence, comprising:
    time data including a start time and a duration time of the object region in the video sequence;
    reference object region information specifying coordinates of vertices of representative points of a figure, the figure representing a reference object region in a shape of polygon;
    type data specifying a parametric model specifying a conversion from the reference object region to an object region of an arbitrary image in the video sequence, the parametric model being described by a motion parameter;
    parameter information specifying a trajectory of a change of the motion parameter, the parameter information comprising;
        time arrangement data including times of points used to determine the trajectory;
        a key value data representing values of the points used to determine the trajectory;
        a function data indicating the trajectory of the motion parameter using information indicating an order of a function used to determine the trajectory or that no function is defined, wherein the parametric model includes at least one of an enlargement and reduction model, a rotation model, a parallel translation model, a 4-parameter model, an affine model, a projection model, and a parabolic model.

14. A data signal of claim 13, wherein:
    the function data is used to indicate the trajectory using a formula:

$$f(t)=fa+va(t-ta),$$

where va=(fb−fa)/(tb−ta), when an order of a function used to indicate the trajectory is first order, where ta represents a time of a first point of the points used to determine the trajectory, tb represents a time of a second point of the points used to determine the trajectory, fa is a coordinate of the first point, fb is a coordinate of the second point, and t is a time of a point to be determined.

15. A data signal of claim 14, wherein the time arrangement data is sorted in increasing order.

16. A data signal of claim 14, wherein the data signal comprises hypermedia information.

17. A data signal of claim 14, wherein the object region in the video sequence appears in a first frame including the reference object region and second and third frames included in the same video sequence, and the function data indicates a positional relationship between the first frame and the second frame and a positional relationship between the first frame and the third frame.

18. A data signal of claim 13, wherein the function data further comprises:

parameter data specifying a second order coefficient for the trajectory when an order of a function indicating the trajectory is second order.

19. A data signal of claim 18, wherein the function data is used to indicate the trajectory using a formula:

$$f(t)=fa+va(t-ta)+\tfrac{1}{2}aa(t-ta)^2,$$

where $va=(fb-fa)/(tb-ta)-\tfrac{1}{2}aa(tb-ta)$ when an order of a function used to indicate the trajectory is second order, where ta represents a time of a first point, tb represents a time of a second point, fa is a coordinate of the first point, fb is a coordinate of the second point, and t is a time of a point to be determined.

20. A data signal of claim 19, wherein the parametric model includes at least one of an enlargement and reduction model, a rotation model, a parallel translation model, a 4-parameter model, an affine model, a projection model, and a parabolic model.

21. A data signal of claim 19, wherein the time arrangement data is sorted in increasing order.

22. A data signal of claim 19, wherein the data signal comprises hypermedia information.

23. A data signal of claim 19, wherein the object region in the video sequence appears in a first frame including the reference object region and second and third frames included in the same video sequence, and the function data indicates a positional relationship between the first frame and the second frame and a positional relationship between the first frame and the third frame.

* * * * *

UNITED STATES PATENT AND TRADEMARK OFFICE
CERTIFICATE OF CORRECTION

PATENT NO. : 6,917,653 B2
DATED : July 12, 2005
INVENTOR(S) : Hori et al.

Page 1 of 1

It is certified that error appears in the above-identified patent and that said Letters Patent is hereby corrected as shown below:

<u>Title page,</u>
After "(*) Notice: Subject to any disclaimer, the term of this patent is extended or adjusted under 35 U.S.C. 154(b) by 0 days. ", insert -- This Patent is subject to a terminal disclaimer. --.

Signed and Sealed this

Sixth Day of September, 2005

JON W. DUDAS
*Director of the United States Patent and Trademark Office*

UNITED STATES PATENT AND TRADEMARK OFFICE
CERTIFICATE OF CORRECTION

PATENT NO. : 6,917,653 B2  Page 1 of 1
DATED : July 12, 2005
INVENTOR(S) : Hori et al.

It is certified that error appears in the above-identified patent and that said Letters Patent is hereby corrected as shown below:

<u>Title page,</u>
Items [45] and [*] Notice, should read as follows:
-- [45]   Date of Patent: ***Jul. 12, 2005

[*]   Notice: Subject to any disclaimer, the term of this patent is extended or adjusted under 35 U.S.C. 154(b) by 0 days.

This Patent is subject to a terminal disclaimer. --.

Signed and Sealed this

Eighth Day of November, 2005

JON W. DUDAS
*Director of the United States Patent and Trademark Office*